United States Patent
Black et al.

(10) Patent No.: US 10,805,000 B2
(45) Date of Patent: Oct. 13, 2020

(54) METHOD AND APPARATUS FOR DISCONTINUOUS TRANSMISSION IN BENT-PIPE RELAY IN SATELLITE COMMUNICATION SYSTEMS

(71) Applicant: QUALCOMM Incorporated, San Diego, CA (US)

(72) Inventors: Peter John Black, San Diego, CA (US); Qiang Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 148 days.

(21) Appl. No.: 15/193,037

(22) Filed: Jun. 25, 2016

(65) Prior Publication Data

US 2017/0027017 A1 Jan. 26, 2017

Related U.S. Application Data

(60) Provisional application No. 62/196,272, filed on Jul. 23, 2015.

(51) Int. Cl.
*H04B 7/185* (2006.01)
*H04W 76/28* (2018.01)
(Continued)

(52) U.S. Cl.
CPC ...... *H04B 7/18513* (2013.01); *H04W 72/042* (2013.01); *H04W 72/1273* (2013.01);
(Continued)

(58) Field of Classification Search
None
See application file for complete search history.

(56) References Cited

U.S. PATENT DOCUMENTS

| 5,285,208 A | 2/1994 | Bertiger et al. |
| 5,561,838 A * | 10/1996 | Chandos ............ H04B 7/18541 455/13.1 |

(Continued)

FOREIGN PATENT DOCUMENTS

| CN | 101360106 A | 2/2009 |
| CN | 104125629 A | 10/2014 |

(Continued)

OTHER PUBLICATIONS

International Search Report and Written Opinion—PCT/US2016/040791—ISA/EPO—dated Oct. 13, 2016.

*Primary Examiner* — Ayaz R Sheikh
*Assistant Examiner* — Tarell A Hampton
(74) *Attorney, Agent, or Firm* — Muncy, Geissler, Olds & Lowe, P.C.

(57) ABSTRACT

Power consumption by a communication satellite may be reduced by operating in a transmission time interval (TTI) gating mode, in which an on period is provided for the satellite to transmit a reference signal (RS), control signals, and a portion of data within an on period through a forward link to a user terminal (UT), followed by an off period in which forward link transmission ceases. During the off period of the TTI, the satellite may turn off its forward link power amplifier and cease transmission of data to the UT. A gateway may send a signal enabling the TTI gating mode, as well as information specifying the TTI gating configuration, such as the length of the on or off period of the TTI, to the satellite.

65 Claims, 14 Drawing Sheets

(51) Int. Cl.
*H04W 72/04* (2009.01)
*H04W 72/12* (2009.01)
*H04W 52/02* (2009.01)
*H04W 88/16* (2009.01)

(52) U.S. Cl.
CPC ............ *H04W 76/28* (2018.02); *H04W 52/02* (2013.01); *H04W 88/16* (2013.01); *Y02D 70/142* (2018.01); *Y02D 70/144* (2018.01); *Y02D 70/162* (2018.01); *Y02D 70/164* (2018.01); *Y02D 70/23* (2018.01); *Y02D 70/25* (2018.01); *Y02D 70/26* (2018.01); *Y02D 70/446* (2018.01)

(56) References Cited

U.S. PATENT DOCUMENTS

| | | | | |
|---|---|---|---|---|
| 5,572,216 | A * | 11/1996 | Weinberg | H01Q 1/288 342/357.2 |
| 5,589,834 | A * | 12/1996 | Weinberg | H04B 7/19 342/354 |
| 5,787,336 | A * | 7/1998 | Hirschfield | H04W 52/52 330/129 |
| 5,826,170 | A | 10/1998 | Hirschfield et al. | |
| 5,974,092 | A * | 10/1999 | Roos | H04B 7/18534 375/272 |
| 6,091,933 | A * | 7/2000 | Sherman | H04B 7/18543 455/13.1 |
| 8,345,650 | B2 * | 1/2013 | Foxworthy | H04B 7/18513 370/338 |
| 8,874,065 | B2 | 10/2014 | Pan et al. | |
| 2003/0046711 | A1 * | 3/2003 | Cui | H04N 5/9265 725/134 |
| 2003/0204851 | A1 * | 10/2003 | Powell | H04H 20/20 725/63 |
| 2005/0083998 | A1 * | 4/2005 | Li | H04B 1/707 375/148 |
| 2006/0221809 | A1 * | 10/2006 | Malladi | H04L 25/03012 370/206 |
| 2007/0133479 | A1 * | 6/2007 | Montojo | H04W 52/0216 370/335 |
| 2008/0155610 | A1 * | 6/2008 | Rosen | H04B 7/18523 725/64 |
| 2008/0186893 | A1 | 8/2008 | Kolding et al. | |
| 2008/0278345 | A1 * | 11/2008 | Van Bosch | H04B 7/18517 340/870.07 |
| 2009/0097447 | A1 * | 4/2009 | Han | H04L 5/0007 370/330 |
| 2009/0125735 | A1 * | 5/2009 | Zimmerman | G06F 1/3203 713/310 |
| 2009/0156225 | A1 * | 6/2009 | Angelow | H04J 11/0093 455/450 |
| 2009/0210729 | A1 * | 8/2009 | Adams | G06F 1/3203 713/320 |
| 2009/0296643 | A1 * | 12/2009 | Cave | H04L 1/1812 370/329 |
| 2010/0091826 | A1 * | 4/2010 | Chen | H04L 25/0236 375/224 |
| 2010/0103906 | A1 | 4/2010 | Montojo et al. | |
| 2010/0197316 | A1 * | 8/2010 | Aoyama | H04W 76/048 455/452.1 |
| 2010/0232311 | A1 * | 9/2010 | Zhang | H04L 5/0007 370/252 |
| 2010/0323683 | A1 * | 12/2010 | Kazmi | H04W 64/00 455/422.1 |
| 2012/0320810 | A1 * | 12/2012 | Nourbakhsh | H04W 52/0235 370/311 |
| 2013/0064173 | A1 * | 3/2013 | Sivavakeesar | H04B 7/15557 370/315 |
| 2013/0070698 | A1 * | 3/2013 | Kim | H04L 5/0016 370/329 |
| 2013/0083712 | A1 * | 4/2013 | Sadek | H04W 16/14 370/311 |
| 2013/0190027 | A1 | 7/2013 | Cao et al. | |
| 2013/0201893 | A1 * | 8/2013 | Hu | H04W 76/048 370/311 |
| 2013/0223330 | A1 * | 8/2013 | Medbo | H04B 7/155 370/315 |
| 2014/0016492 | A1 | 1/2014 | Jung et al. | |
| 2014/0362832 | A1 | 12/2014 | Rudolf et al. | |
| 2014/0369247 | A1 | 12/2014 | Sambhwani et al. | |
| 2015/0131703 | A1 * | 5/2015 | Balter | H04B 7/18513 375/133 |
| 2015/0305084 | A1 * | 10/2015 | Ji | H04W 52/0216 370/311 |

FOREIGN PATENT DOCUMENTS

| | | |
|---|---|---|
| EP | 1037402 A2 | 9/2000 |
| GB | 2517667 A | 3/2015 |
| JP | H0399527 A | 4/1991 |
| JP | 2000295171 A | 10/2000 |
| WO | 2007079966 A1 | 7/2007 |
| WO | 2015009981 A1 | 1/2015 |

* cited by examiner

METHOD AND APPARATUS FOR DISCONTINUOUS TRANSMISSION IN BENT-PIPE RELAY IN SATELLITE COMMUNICATION SYSTEMS

CROSS-REFERENCE TO RELATED APPLICATIONS

The present application for patent claims the benefit of U.S. Provisional Application No. 62/196,272, entitled "METHOD AND APPARATUS FOR DISCONTINUOUS TRANSMISSION IN BENT-PIPE RELAY IN SATELLITE COMMUNICATION SYSTEMS," filed Jul. 23, 2015, assigned to the assignee hereof and expressly incorporated herein by reference in its entirety.

INTRODUCTION

Various aspects described herein relate to satellite communications, and more particularly, to discontinuous transmission for reducing power consumption by communication satellites.

Conventional satellite-based communication systems include gateways and one or more satellites to relay communication signals between the gateways and one or more user terminals. A gateway is an Earth station having an antenna for transmitting signals to, and receiving signals from, communication satellites. A gateway provides communication links, using satellites, for connecting a user terminal to other user terminals or users of other communication systems, such as a public switched telephone network, Internet, and various public and/or private networks. A satellite is an orbiting receiver and repeater used to relay information.

A satellite can receive signals from and transmit signals to a user terminal provided the user terminal is within the footprint of the satellite. The footprint of a satellite is the geographic region on the surface of the Earth within the range of signals of the satellite. The footprint is usually geographically divided into beams, through the use of beam-forming antennas. Each beam covers a particular geographic region within the footprint. Beams may be directed so that more than one beam from the same satellite covers the same specific geographic region.

Geosynchronous satellites have long been used for communications. A geosynchronous satellite is stationary relative to a given location on the Earth, and thus there is little timing shift and Doppler frequency shift in radio signal propagation between a communication transceiver on the Earth and the geosynchronous satellite. However, because geosynchronous satellites are limited to a geosynchronous orbit (GSO), which is a circle having a radius of approximately 42,164 km from the center of the Earth directly above the Earth's equator, the number of satellites that may be placed in the GSO is limited. As alternatives to geosynchronous satellites, communication systems that utilize a constellation of satellites in non-geosynchronous orbits, such as low-earth orbits (LEO), have been devised to provide communication coverage to the entire Earth or at least large parts of the Earth.

Communication satellites are typically powered by batteries and solar panels. Satellites that consume a large amount of power may require batteries and solar panels of large sizes and masses, which may result in increased costs of not only manufacturing but also launching the satellites. In typical communication satellites, overall power consumption may be contributed to a large extent by power amplifiers. It is desirable to reduce power consumption by various components, especially by power amplifiers, in low-cost communication satellites.

SUMMARY

The following summary is an overview provided solely to aid in the description of various aspects of the disclosure and is provided solely for illustration of the aspects and not limitation thereof.

In one aspect, a method of controlling power of transmission of a satellite is provided, the method comprising: enabling a gating mode for a transmission time interval (TTI) for the satellite; sending gating configuration information including at least one of an on period or an off period of the TTI, or a combination thereof, to the satellite; and transmitting data in a portion of a data region in the on period of the TTI.

In another aspect, an apparatus configured to control power of transmission of a satellite is provided, the apparatus comprising: at least one processor; and at least one memory coupled to the at least one processor, the at least one processor and the at least one memory being configured to: enable a gating mode for a transmission time interval (TTI) for the satellite; send gating configuration information including at least one of an on period or an off period of the TTI, or a combination thereof, to the satellite; and transmit data in a portion of a data region in the on period of the TTI.

In another aspect, an apparatus for controlling power of transmission of a satellite is provided, the apparatus comprising: means for enabling a gating mode for a transmission time interval (TTI) for the satellite; means for sending gating configuration information including at least one of an on period or an off period of the TTI, or a combination thereof, to the satellite; and means for transmitting data in a portion of a data region in the on period of the TTI.

In another aspect, a computer-readable medium comprising instructions for causing a computer or processor to perform a method to control power of transmission of a satellite is provided, the instructions comprising instructions to: enable a gating mode for a transmission time interval (TTI) for the satellite; send gating configuration information including at least one of an on period or an off period of the TTI, or a combination thereof, to the satellite; and transmit data in a portion of a data region in the on period of the TTI.

In another aspect, a method of controlling transmission of power by a satellite is provided, the method comprising: receiving a signal to enable a gating mode for a transmission time interval (TTI); receiving gating configuration information including at least one of an on period or an off period of the TTI, or a combination thereof; transponding data in a portion of a data region in the on period of the TTI; and ceasing transmission of data in the off period of the TTI.

In another aspect, an apparatus configured to control power of transmission by a satellite is provided, the apparatus comprising: at least one processor; and at least one memory coupled to the at least one processor, the at least one processor and the at least one memory being configured to: receive a signal to enable a gating mode for a transmission time interval (TTI); receive gating configuration information including at least one of an on period or an off period of the TTI, or a combination thereof; transpond data in a portion of a data region in the on period of the TTI; and cease transmission of data in the off period of the TTI.

In another aspect, an apparatus for controlling power of transmission by a satellite is provided, the apparatus comprising: means for receiving a signal to enable a gating mode for a transmission time interval (TTI); means for receiving gating configuration information including at least one of an on period or an off period of the TTI, or a combination thereof; means for transponding data in a portion of a data region in the on period of the TTI; and means for ceasing transmission of data in the off period of the TTI.

In another aspect, a transitory or non-transitory computer-readable medium comprising instructions for causing a computer or processor to perform a method to control power of transmission by a satellite is provided, the instructions comprising instructions to: receive a signal to enable a gating mode for a transmission time interval (TTI); receive gating configuration information including at least one of an on period or an off period of the TTI, or a combination thereof; transpond data in a portion of a data region in the on period of the TTI; and cease transmission of data in the off period of the TTI.

In another aspect, a method of controlling power of transmission of a satellite is provided, the method comprising: enabling a gating mode for a transponded transmission time interval (TTI) for the satellite, wherein the gating mode defines an on period and an off period of the TTI; setting the on period to span a time interval associated with data transmission scheduling for one or more user terminals; providing gating configuration information indicating the on period of the TTI to the satellite; and transmitting data to the one or more user terminals via the satellite during at least a portion of the on period of the TTI.

In another aspect, an apparatus configured to control power of transmission by a satellite is provided, the apparatus comprising: at least one processor; and at least one memory coupled to the at least one processor, the at least one processor and the at least one memory being configured to: enable a gating mode for a transponded transmission time interval (TTI) for the satellite, wherein the gating mode defines an on period and an off period of the TTI; set the on period to span a time interval associated with data transmission scheduling for one or more user terminals; provide gating configuration information indicating the on period of the TTI to the satellite; and transmit data to the one or more user terminals via the satellite during at least a portion of the on period of the TTI.

In another aspect, an apparatus for controlling power of transmission by a satellite is provided, the apparatus comprising: means for enabling a gating mode for a transponded transmission time interval (TTI) for the satellite, wherein the gating mode defines an on period and an off period of the TTI; means for setting the on period to span a time interval associated with data transmission scheduling for one or more user terminals; means for providing gating configuration information indicating the on period of the TTI to the satellite; and means for transmitting data to the one or more user terminals via the satellite during at least a portion of the on period of the TTI.

In another aspect, a transitory or non-transitory computer-readable medium comprising instructions for causing a computer or processor to perform a method to control power of transmission by a satellite is provided, the instructions comprising instructions to: enable a gating mode for a transponded transmission time interval (TTI) for the satellite, wherein the gating mode defines an on period and an off period of the TTI; set the on period to span a time interval associated with data transmission scheduling for one or more user terminals; provide gating configuration information indicating the on period of the TTI to the satellite; and transmit data to the one or more user terminals via the satellite during at least a portion of the on period of the TTI.

DETAILED DESCRIPTION

Figure 1:
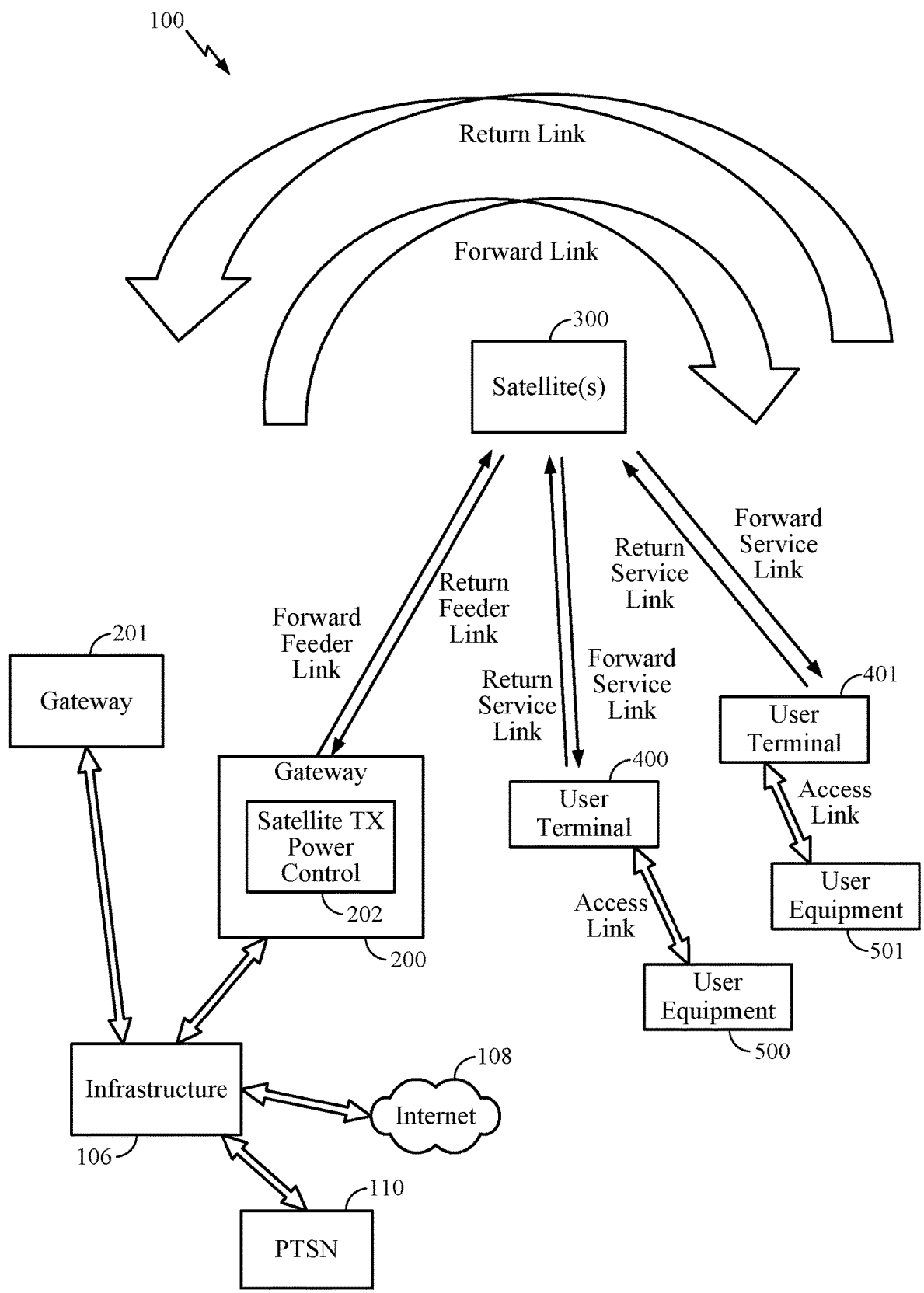
FIG. 1 is a block diagram of an example satellite communication system.

In non-geosynchronous satellite communication systems, such as low-earth-orbit (LEO) satellite communication systems, a large number of satellites are typically required to form a constellation, to allow ground stations including gateways and user terminals (UTs) to maintain communications even though each individual satellite in the constellation is not at a fixed location with respect to the ground stations at different instants of time. To reduce the cost of making each satellite in an LEO satellite communication system, each satellite may serve as a bent-pipe relay or transponder, that is, without its own data processing.

Bent-pipe relay or transponder satellites are typically powered by batteries or solar panels, or a combination of both. Power amplifiers such as solid state power amplifiers (SSPAs) are typically implemented in bent-pipe relay or transponder satellites to transmit forward link (FL) signals to UTs or to transmit return link (RL) signals to gateways. In order to reduce the sizes and masses of batteries or solar panels in a communication satellite, thereby reducing the costs of building and launching the satellite, it is desirable to reduce the power consumption by power amplifiers on the satellite. In one aspect, a transmission time interval (TTI) level gated transmission mode, also known as a TTI gating mode, is provided for satellite signal transmission. In one aspect, each TTI is divided into an on period and an off period. In one aspect, the satellite can turn off a forward link power amplifier to save power during the off period of each TTI.

Specific examples of the disclosure are described in the following description and related drawings. Alternate examples may be devised without departing from the scope of the disclosure. Additionally, well-known elements will not be described in detail or will be omitted so as not to obscure the relevant details of the disclosure.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein is for the purpose of describing particular aspects only and is not intended to be limiting of the aspects. As used herein, the singular forms "a," "an," and "the" are intended to include the plural forms as well, unless the context clearly indicates otherwise. It will be further understood that the terms "comprises," "comprising," "includes," or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to," or "in communication with" are not limited to direct connections unless expressly stated otherwise.

Further, many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application-specific integrated circuits (ASICs), field programmable gate arrays (FPGAs), or various other types of general purpose or special purpose processors or circuits, by program instructions being executed by one or more processors, or by a combination of both. Additionally, the sequence of actions described herein can be considered to be embodied entirely within any form of computer-readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

FIG. 1 illustrates an example of a satellite communication system 100 which includes a plurality of satellites (although only one satellite 300 is shown for clarity of illustration) in non-geosynchronous orbits, for example, low-earth orbits (LEO), a gateway 200 in communication with the satellite 300, a plurality of user terminals (UTs) 400 and 401 in communication with the satellite 300, and a plurality of user equipment (UE) 500 and 501 in communication with the UTs 400 and 401, respectively. In one aspect, the gateway 200 includes a block for satellite transmit (TX) power control 202. Each UE 500 or 501 may be a user device such as a mobile device, a telephone, a smartphone, a tablet, a laptop computer, a computer, a wearable device, a smart watch, an audiovisual device, or any device including the capability to communicate with a UT. Additionally, the UE 500 and/or UE 501 may be a device (e.g., access point, small cell, etc.) that is used to communicate with one or more end user devices. In the example illustrated in FIG. 1, the UT 400 and the UE 500 communicate with each other via a bidirectional access link (having a forward access link and return access link), and similarly, the UT 401 and the UE 501 communicate with each other via another bidirectional access link. In another implementation, one or more additional UEs (not shown) may be configured to receive only and therefore communicate with a UT only using a forward access link. In another implementation, one or more additional UEs (not shown) may also communicate with the UT 400 or UT 401. Alternatively, a UT and a corresponding UE may be integral parts of a single physical device, such as a mobile telephone with an integral satellite transceiver and an antenna for communicating directly with a satellite, for example.

The gateway 200 may have access to Internet 108 or one or more other types of public, semiprivate, or private networks. In the example illustrated in FIG. 1, the gateway 200 is in communication with infrastructure 106, which is capable of accessing the Internet 108 or one or more other types of public, semiprivate or private networks. The gateway 200 may also be coupled to various types of communication backhaul, including, for example, landline networks such as optical fiber networks or public switched telephone networks (PSTN) 110. Further, in alternative implementations the gateway 200 may interface to the Internet 108, the PSTN 110, or one or more other types of public, semiprivate, or private networks without using the infrastructure 106. Furthermore, the gateway 200 may communicate with other gateways, such as gateway 201 through the infrastructure 106 or alternatively may be configured to communicate to the gateway 201 without using the infrastructure 106. The infrastructure 106 may include, in whole or part, a network control center (NCC), a satellite control center (SCC), a wired and/or wireless core network, and/or any other components or systems used to facilitate operation of and/or communication with the satellite communication system 100.

Communications between the satellite 300 and the gateway 200 in both directions are called feeder links, whereas communications between the satellite 300 and each of the UTs 400 and 401 in both directions are called service links. A signal path from the satellite 300 to a ground station, which may be the gateway 200 or one of the UTs 400 and 401, may be generically called a downlink. A signal path from a ground station to the satellite 300 may be generically called an uplink. Additionally, as illustrated, signals can have a general directionality such as a forward link and a return link or reverse link. Accordingly, a communication link in a direction originating from the gateway 200 and terminating at the UT 400 through the satellite 300 is called a forward link, whereas a communication link in a direction originating from the UT 400 and terminating at the gateway 200 through the satellite 300 is called a return link or reverse link. As such, the signal path from the gateway 200 to the satellite 300 is labeled "Forward Feeder Link" whereas the signal path from the satellite 300 to the gateway 200 is labeled "Return Feeder Link" in FIG. 1. In a similar manner, the signal path from each UT 400 or 401 to the satellite 300 is labeled "Return Service Link" whereas the signal path from the satellite 300 to each UT 400 or 401 is labeled "Forward Service Link" in FIG. 1.

Figure 2:
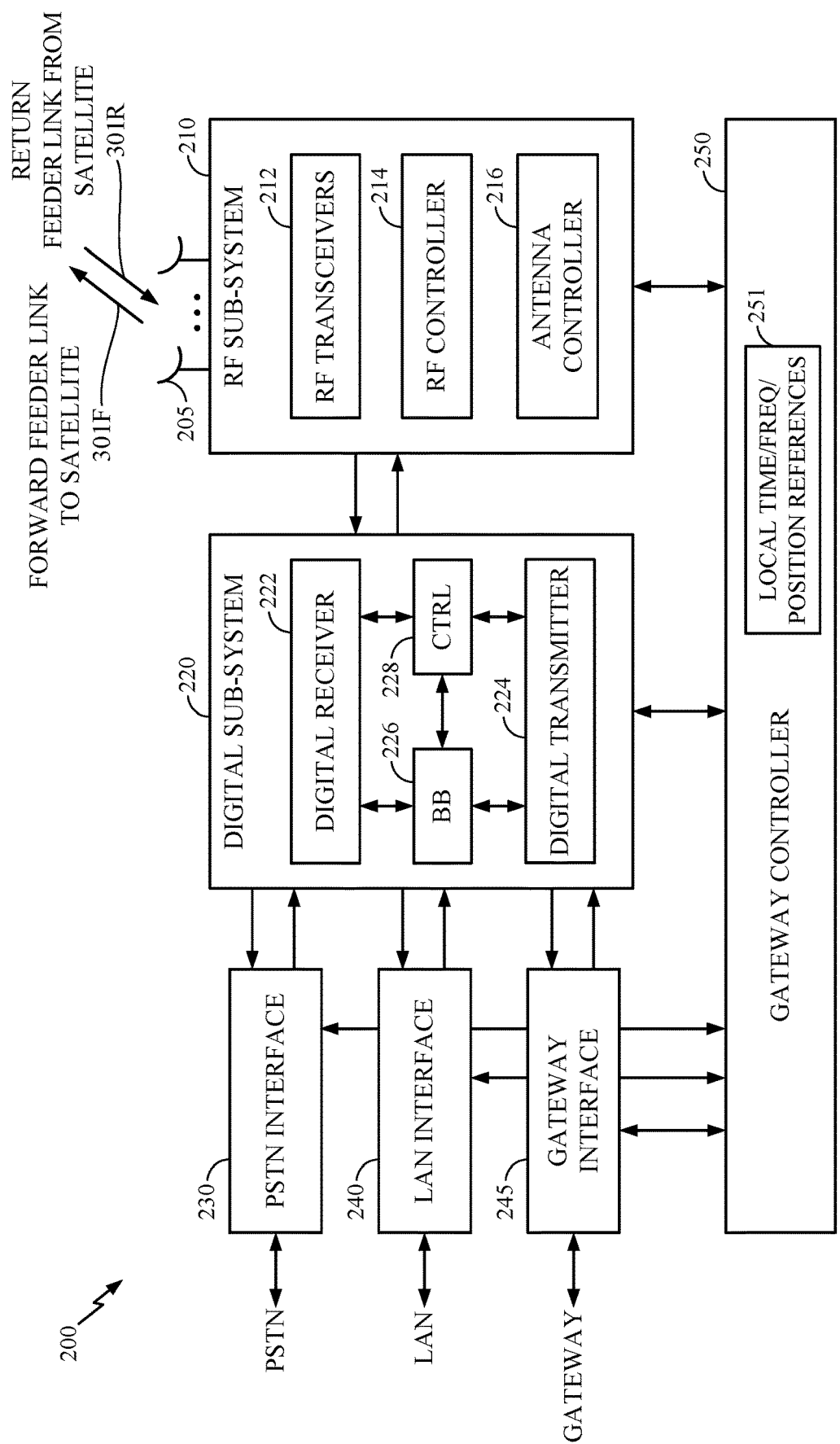
FIG. 2 is a block diagram of one example of the gateway of FIG. 1.

FIG. 2 is an example block diagram of the gateway 200, which also can apply to the gateway 201 of FIG. 1. The gateway 200 is shown to include a number of antennas 205, an RF subsystem 210, a digital subsystem 220, a Public Switched Telephone Network (PSTN) interface 230, a Local Area Network (LAN) interface 240, a gateway interface 245, and a gateway controller 250. The RF subsystem 210 is coupled to the antennas 205 and to the digital subsystem 220. The digital subsystem 220 is coupled to the PSTN interface 230, to the LAN interface 240, and to the gateway interface 245. The gateway controller 250 is coupled to the RF subsystem 210, the digital subsystem 220, the PSTN interface 230, the LAN interface 240, and the gateway interface 245.

The RF subsystem 210, which may include a number of RF transceivers 212, an RF controller 214, and an antenna controller 216, may transmit communication signals to the satellite 300 via a forward feeder link 301F, and may receive communication signals from the satellite 300 via a return feeder link 301R. Although not shown for simplicity, each of the RF transceivers 212 may include a transmit chain and a receive chain. Each receive chain may include a low noise amplifier (LNA) and a down-converter (e.g., a mixer) to amplify and down-convert, respectively, received communication signals in a well-known manner. In addition, each receive chain may include an analog-to-digital converter (ADC) to convert the received communication signals from analog signals to digital signals (e.g., for processing by digital subsystem 220). Each transmit chain may include an up-converter (e.g., a mixer) and a power amplifier (PA) to up-convert and amplify, respectively, communication signals to be transmitted to the satellite 300 in a well-known manner. In addition, each transmit chain may include a digital-to-analog converter (DAC) to convert the digital signals received from the digital subsystem 220 to analog signals to be transmitted to the satellite 300.

The RF controller 214 may be used to control various aspects of the number of RF transceivers 212 (e.g., selection of the carrier frequency, frequency and phase calibration, gain settings, and the like). The antenna controller 216 may control various aspects of the antennas 205 (e.g., beamforming, beam steering, gain settings, frequency tuning, and the like).

The digital subsystem 220 may include a number of digital receiver modules 222, a number of digital transmitter modules 224, a baseband (BB) processor 226, and a control (CTRL) processor 228. The digital subsystem 220 may process communication signals received from the RF subsystem 210 and forward the processed communication signals to the PSTN interface 230 and/or the LAN interface 240, and may process communication signals received from the PSTN interface 230 and/or the LAN interface 240 and forward the processed communication signals to the RF subsystem 210.

Each digital receiver module 222 may correspond to signal processing elements used to manage communications between the gateway 200 and the UT 400. One of the receive chains of the RF transceivers 212 may provide input signals to the digital receiver modules 222. A number of digital receiver modules 222 may be used to accommodate all of the satellite beams and possible diversity mode signals being handled at any given time. Although not shown for simplicity, each digital receiver module 222 may include one or more digital data receivers, a searcher receiver, and a diversity combiner and decoder circuit. The searcher receiver may be used to search for appropriate diversity modes of carrier signals, and may be used to search for pilot signals (or other relatively fixed pattern strong signals).

The digital transmitter modules 224 may process signals to be transmitted to the UT 400 via the satellite 300. Although not shown for simplicity, each digital transmitter module 224 may include a transmit modulator that modulates data for transmission. The transmission power of each transmit modulator may be controlled by a corresponding digital transmit power controller (not shown for simplicity) that may (1) apply a minimum level of power for purposes of interference reduction and resource allocation and (2) apply appropriate levels of power when needed to compensate for attenuation in the transmission path and other path transfer characteristics.

The control processor (CTRL) 228, which is coupled to the digital receiver modules 222, the digital transmitter modules 224, and the baseband processor (BB) 226, may provide command and control signals to effect functions such as, but not limited to, signal processing, timing signal generation, power control, handoff control, diversity combining, and system interfacing.

The control processor (CTRL) 228 may also control the generation and power of pilot, synchronization, and paging channel signals and their coupling to the transmit power controller (not shown for simplicity). The pilot channel is a signal that is not modulated by data, and may use a repetitive unchanging pattern or non-varying frame structure type (pattern) or tone type input. For example, the orthogonal function used to form the channel for the pilot signal generally has a constant value, such as all 1's or 0's, or a well-known repetitive pattern, such as a structured pattern of interspersed 1's and 0's.

The baseband processor (BB) 226 is well known in the art and is therefore not described in detail herein. For example, the baseband processor (BB) 226 may include a variety of known elements such as (but not limited to) coders, data modems, and digital data switching and storage components.

The PSTN interface 230 may provide communication signals to, and receive communication signals from, an external PSTN either directly or through the infrastructure 106, as illustrated in FIG. 1. The PSTN interface 230 is well known in the art, and therefore is not described in detail herein. For other implementations, the PSTN interface 230 may be omitted, or may be replaced with any other suitable interface that connects the gateway 200 to a ground-based network (e.g., the Internet).

The LAN interface 240 may provide communication signals to, and receive communication signals from, an external LAN. For example, the LAN interface 240 may be coupled to the Internet 108 either directly or through the infrastructure 106, as illustrated in FIG. 1. The LAN interface 240 is well known in the art, and therefore is not described in detail herein.

The gateway interface 245 may provide communication signals to, and receive communication signals from, one or more other gateways associated with the satellite communication system 100 of FIG. 1 (and/or to/from gateways associated with other satellite communication systems, not shown for simplicity). For some implementations, the gateway interface 245 may communicate with other gateways via one or more dedicated communication lines or channels (not shown for simplicity). For other implementations, the gateway interface 245 may communicate with other gateways using the PSTN interface 230 and/or other networks such as the Internet 108 (see also FIG. 1). For at least one implementation, the gateway interface 245 may communicate with other gateways via the infrastructure 106.

Overall gateway control may be provided by the gateway controller 250. The gateway controller 250 may plan and control utilization of the satellite 300's resources by the gateway 200. For example, the gateway controller 250 may analyze trends, generate traffic plans, allocate satellite resources, monitor (or track) satellite positions, and monitor the performance of the gateway 200 and/or the satellite 300. The gateway controller 250 may also be coupled to a ground-based satellite controller (not shown for simplicity) that maintains and monitors orbits of the satellite 300, relays satellite usage information to the gateway 200, tracks the positions of the satellite 300, and/or adjusts various channel settings of the satellite 300.

For the example implementation illustrated in FIG. 2, the gateway controller 250 includes a local time, frequency, and position references 251, which may provide local time or frequency information to the RF subsystem 210, the digital subsystem 220, and/or the interfaces 230, 240, and 245. The time or frequency information may be used to synchronize the various components of the gateway 200 with each other and/or with the satellite 300. The local time, frequency, and position references 251 may also provide position information (e.g., ephemeris data) of the satellite 300 to the various components of the gateway 200. Further, although depicted in FIG. 2 as included within the gateway controller 250, for other implementations, the local time, frequency, and position references 251 may be a separate subsystem that is coupled to the gateway controller 250 (and/or to one or more of the digital subsystem 220 and the RF subsystem 210).

Although not shown in FIG. 2 for simplicity, the gateway controller 250 may also be coupled to a network control center (NCC) and/or a satellite control center (SCC). For example, the gateway controller 250 may allow the SCC to communicate directly with the satellite 300, for example, to retrieve ephemeris data from the satellite 300. The gateway controller 250 may also receive processed information (e.g., from the SCC and/or the NCC) that allows the gateway controller 250 to properly aim the antennas 205 (e.g., at the satellite 300), to schedule beam transmissions, to coordinate handovers, and to perform various other well-known functions.

Figure 3:
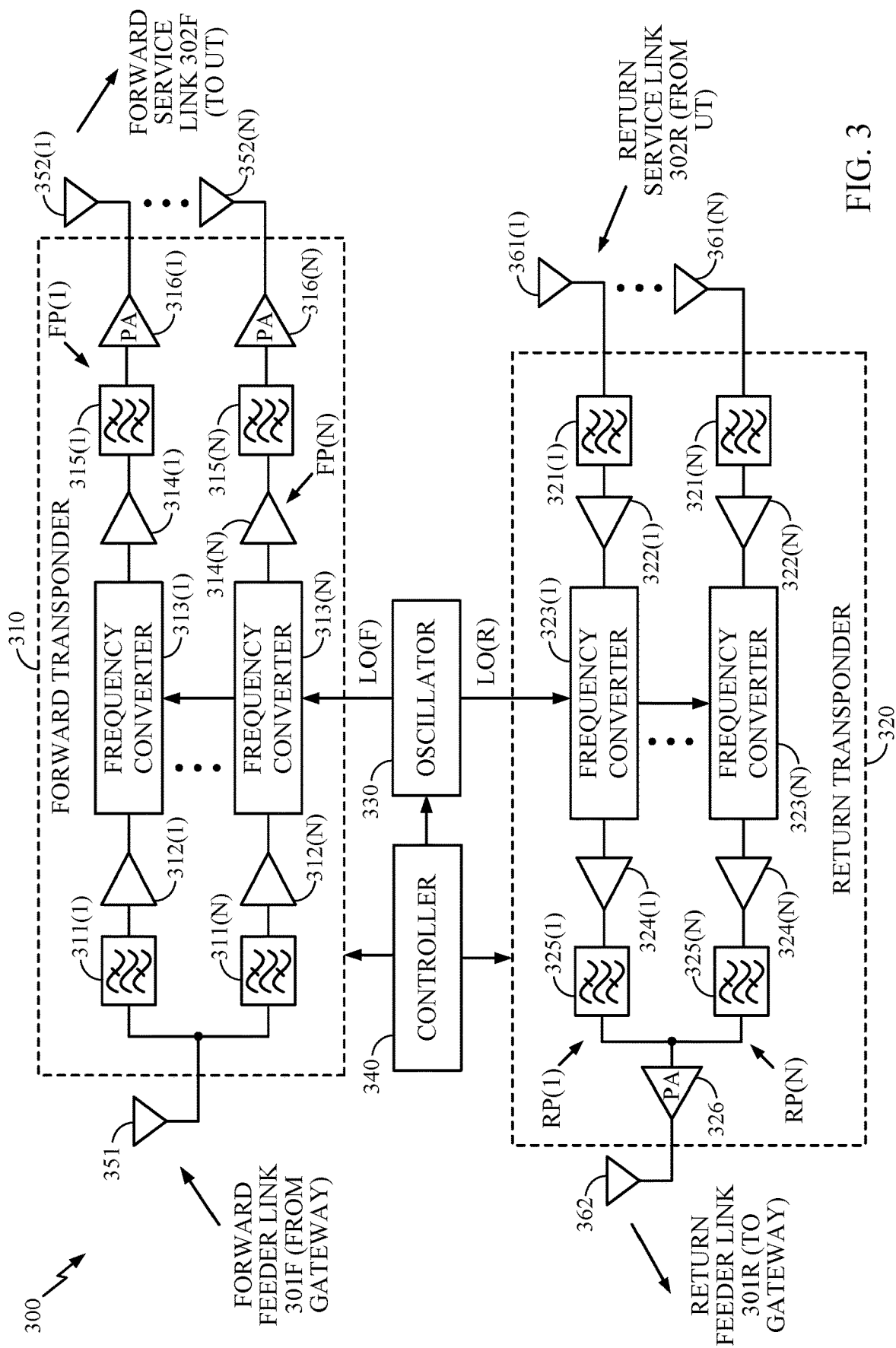
FIG. 3 is a block diagram of one example of the satellite of FIG. 1.

FIG. 3 is an example block diagram of the satellite 300 for illustrative purposes only. It will be appreciated that specific satellite configurations can vary significantly and may or may not include on-board processing. Further, although illustrated as a single satellite, two or more satellites using inter-satellite communication may provide the functional connection between the gateway 200 and the UT 400. It will be appreciated that disclosure is not limited to any specific satellite configuration and any satellite or combinations of satellites that can provide the functional connection between the gateway 200 and the UT 400 can be considered within the scope of the disclosure. In one example, the satellite 300 is shown to include a forward transponder 310, a return transponder 320, an oscillator 330, a controller 340, forward link antennas 352(1)-352(N), and return link antennas 361(1)-361(N). The forward transponder 310, which may process communication signals within a corresponding channel or frequency band, may include a respective one of first bandpass filters 311(1)-311(N), a respective one of first LNAs 312(1)-312(N), a respective one of frequency converters 313(1)-313(N), a respective one of second LNAs 314(1)-314(N), a respective one of second bandpass filters 315(1)-315(N), and a respective one of PAs 316(1)-316(N). Each of the PAs 316(1)-316(N) is coupled to a respective one of antennas 352(1)-352(N), as shown in FIG. 3.

Within each of the respective forward paths FP(1)-FP(N), the first bandpass filters 311(1)-311(N) pass signal components having frequencies within the channel or frequency band of the respective forward paths FP(1)-FP(N), and filter signal components having frequencies outside the channel or frequency band of the respective forward paths FP(1)-FP(N). Thus, the pass bands of the first bandpass filters 311(1)-311(N) correspond to the width of the channel associated with the respective forward paths FP(1)-FP(N). The first LNAs 312(1)-312(N) amplify the received communication signals to a level suitable for processing by the frequency converters 313(1)-313(N). The frequency converters 313(1)-313(N) convert the frequency of the communication signals in the respective forward paths FP(1)-FP(N) (e.g., to a frequency suitable for transmission from the satellite 300 to the UT 400). The second LNAs 314(1)-314(N) amplify the frequency-converted communication signals, and the second bandpass filters 315(1)-315(N) filter signal components having frequencies outside of the associated channel width. The PAs 316(1)-316(N) amplify the filtered signals to a power level suitable for transmission to the UT 400 via respective antennas 352(1)-352(N). The return transponder 320, which includes a number N of return paths RP(1)-RP(N), receives communication signals from the UT 400 along return service link 302R via the antennas 361(1)-361(N), and transmits communication signals to the gateway 200 along return feeder link 301R via one or more antennas 362. Each of the return paths RP(1)-RP(N), which may process communication signals within a corresponding channel or frequency band, may be coupled to a respective one of the antennas 361(1)-361(N), and may include a respective one of first bandpass filters 321(1)-321(N), a respective one of first LNAs 322(1)-322(N), a respective one of frequency converters 323(1)-323(N), a respective one of second LNAs 324(1)-324(N), and a respective one of second bandpass filters 325(1)-325(N).

Within each of the respective return paths RP(1)-RP(N), the first bandpass filters 321(1)-321(N) pass signal components having frequencies within the channel or frequency band of the respective return paths RP(1)-RP(N), and filter signal components having frequencies outside the channel or frequency band of the respective return paths RP(1)-RP(N). Thus, the pass bands of the first bandpass filters 321(1)-321(N) may for some implementations correspond to the width of the channel associated with the respective return paths RP(1)-RP(N). The first LNAs 322(1)-322(N) amplify all the received communication signals to a level suitable for processing by the frequency converters 323(1)-323(N). The frequency converters 323(1)-323(N) convert the frequency of the communication signals in the respective return paths RP(1)-RP(N) (e.g., to a frequency suitable for transmission from the satellite 300 to the gateway 200). The second LNAs 324(1)-324(N) amplify the frequency-converted communication signals, and the second bandpass filters 325(1)-325(N) filter signal components having frequencies outside of the associated channel width. Signals from the return paths RP(1)-RP(N) are combined and provided to the one or more antennas 362 via a PA 326. The PA 326 amplifies the combined signals for transmission to the gateway 200.

The oscillator 330, which may be any suitable circuit or device that generates an oscillating signal, provides a forward local oscillator LO(F) signal to the frequency converters 313(1)-313(N) of the forward transponder 310, and provides a return local oscillator LO(R) signal to the frequency converters 323(1)-323(N) of the return transponder 320. For example, the LO(F) signal may be used by the frequency converters 313(1)-313(N) to convert communication signals from a frequency band associated with the transmission of signals from the gateway 200 to the satellite 300 to a frequency band associated with the transmission of signals from the satellite 300 to the UT 400. The LO(R) signal may be used by the frequency converters 323(1)-323 (N) to convert communication signals from a frequency band associated with the transmission of signals from the UT 400 to the satellite 300 to a frequency band associated with the transmission of signals from the satellite 300 to the gateway 200.

The controller 340, which is coupled to the forward transponder 310, the return transponder 320, and the oscillator 330, may control various operations of the satellite 300 including (but not limited to) channel allocations. In one aspect, the controller 340 may include a memory coupled to a processor (not shown for simplicity). The memory may include a non-transitory computer-readable medium (e.g., one or more nonvolatile memory elements, such as EPROM, EEPROM, Flash memory, a hard drive, etc.) storing instructions that, when executed by the processor, cause the satellite 300 to perform operations including (but not limited to) those described herein.

Figure 4:
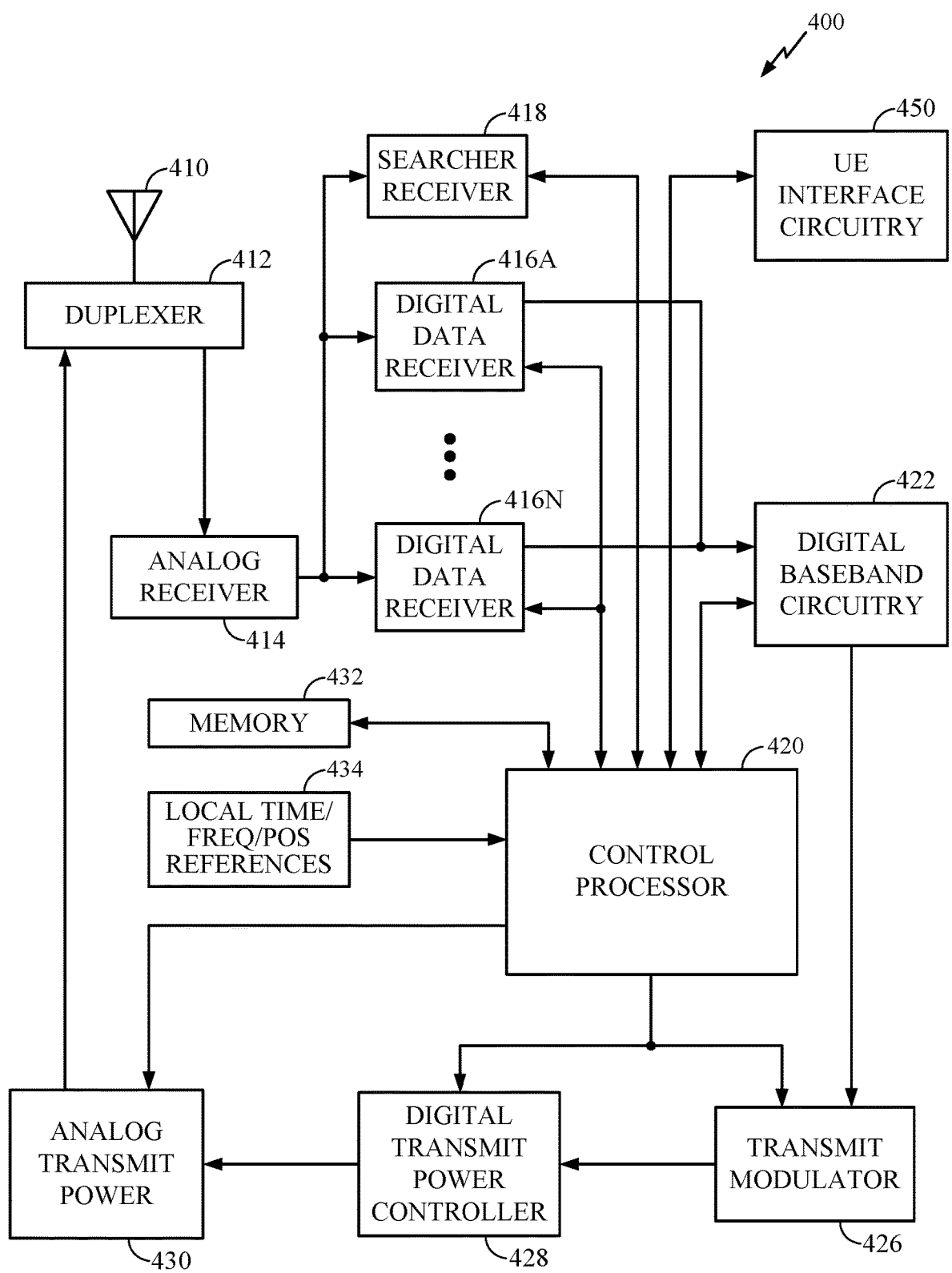
FIG. 4 is a block diagram of one example of the user terminal of FIG. 1.

An example of a transceiver for use in the UT 400 or 401 is illustrated in FIG. 4. In FIG. 4, at least one antenna 410 is provided for receiving forward link communication signals (e.g., from satellite 300), which are transferred to an analog receiver 414, where they are down-converted, amplified, and digitized. A duplexer element 412 is often used to allow the same antenna to serve both transmit and receive functions. Alternatively, the UT 400 may employ separate antennas for operating at different transmit and receive frequencies.

The digital communication signals output by the analog receiver 414 are transferred to at least one digital data receiver 416A-416N and at least one searcher receiver 418. The digital data receivers to 416A-416N can be used to obtain desired levels of signal diversity, depending on the acceptable level of transceiver complexity, as would be apparent to one skilled in the relevant art.

At least one user terminal control processor 420 is coupled to the digital data receivers 416A-416N and the searcher receiver 418. The control processor 420 provides, among other functions, basic signal processing, timing, power and handoff control or coordination, and selection of frequency used for signal carriers. Another basic control function that may be performed by the control processor 420 is the selection or manipulation of functions to be used for processing various signal waveforms. Signal processing by the control processor 420 can include a determination of relative signal strength and computation of various related signal parameters. Such computations of signal parameters, such as timing and frequency may include the use of additional or separate dedicated circuitry to provide increased efficiency or speed in measurements or improved allocation of control processing resources.

The outputs of the digital data receivers 416A-416N are coupled to digital baseband circuitry 422 within the UT 400. The digital baseband circuitry 422 comprises processing and presentation elements used to transfer information to and from UE 500 as shown in FIG. 1, for example. Referring to FIG. 4, if diversity signal processing is employed, the digital baseband circuitry 422 may comprise a diversity combiner and decoder. Some of these elements may also operate under the control of, or in communication with, the control processor 420.

When voice or other data is prepared as an output message or communications signal originating with the UT 400, the digital baseband circuitry 422 is used to receive, store, process, and otherwise prepare the desired data for transmission. The digital baseband circuitry 422 provides this data to a transmit modulator 426 operating under the control of the control processor 420. The output of the transmit modulator 426 is transferred to a digital transmit power controller 428 which provides output power control to an analog transmit power amplifier 430 for final transmission of the output signal from the antenna 410 to a satellite (e.g., satellite 300).

In FIG. 4, the UT 400 also includes a memory 432 associated with the control processor 420. The memory 432 may include instructions for execution by the control processor 420 as well as data for processing by the control processor 420. In the example illustrated in FIG. 4, the memory 432 may include instructions for performing time or frequency adjustments to be applied to an RF signal to be transmitted by the UT 400 via the return service link to the satellite 300.

In the example illustrated in FIG. 4, the UT 400 also includes an optional local time, frequency and/or position references 434 (e.g., a GPS receiver), which may provide local time, frequency and/or position information to the control processor 420 for various applications, including, for example, time or frequency synchronization for the UT 400.

The digital data receivers 416A-N and the searcher receiver 418 are configured with signal correlation elements to demodulate and track specific signals. The searcher receiver 418 is used to search for pilot signals, or other relatively fixed pattern strong signals, while the digital data receivers 416A-N are used to demodulate other signals associated with detected pilot signals. However, the digital data receivers 416A-N can be assigned to track the pilot signal after acquisition to accurately determine the ratio of signal chip energies to signal noise, and to formulate pilot signal strength. Therefore, the outputs of these units can be monitored to determine the energy in, or frequency of, the pilot signal or other signals. These digital data receivers 416A-N also employ frequency tracking elements that can be monitored to provide current frequency and timing information to the control processor 420 for signals being demodulated.

The control processor 420 may use such information to determine to what extent the received signals are offset from the oscillator frequency, when scaled to the same frequency band, as appropriate. This, and other information related to frequency errors and frequency shifts, can be stored in the memory 432 as desired.

The control processor 420 may also be coupled to UE interface circuitry 450 to allow communications between the UT 400 and one or more UEs. The UE interface circuitry 450 may be configured as desired for communication with various UE configurations and accordingly may include various transceivers and related components depending on the various communication technologies employed to communicate with the various UEs supported. For example, the UE interface circuitry 450 may include one or more antennas, a wide area network (WAN) transceiver, a wireless local area network (WLAN) transceiver, a Local Area Network (LAN) interface, a Public Switched Telephone Network (PSTN) interface and/or other known communication technologies configured to communicate with one or more UEs in communication with the UT 400.

Figure 5:
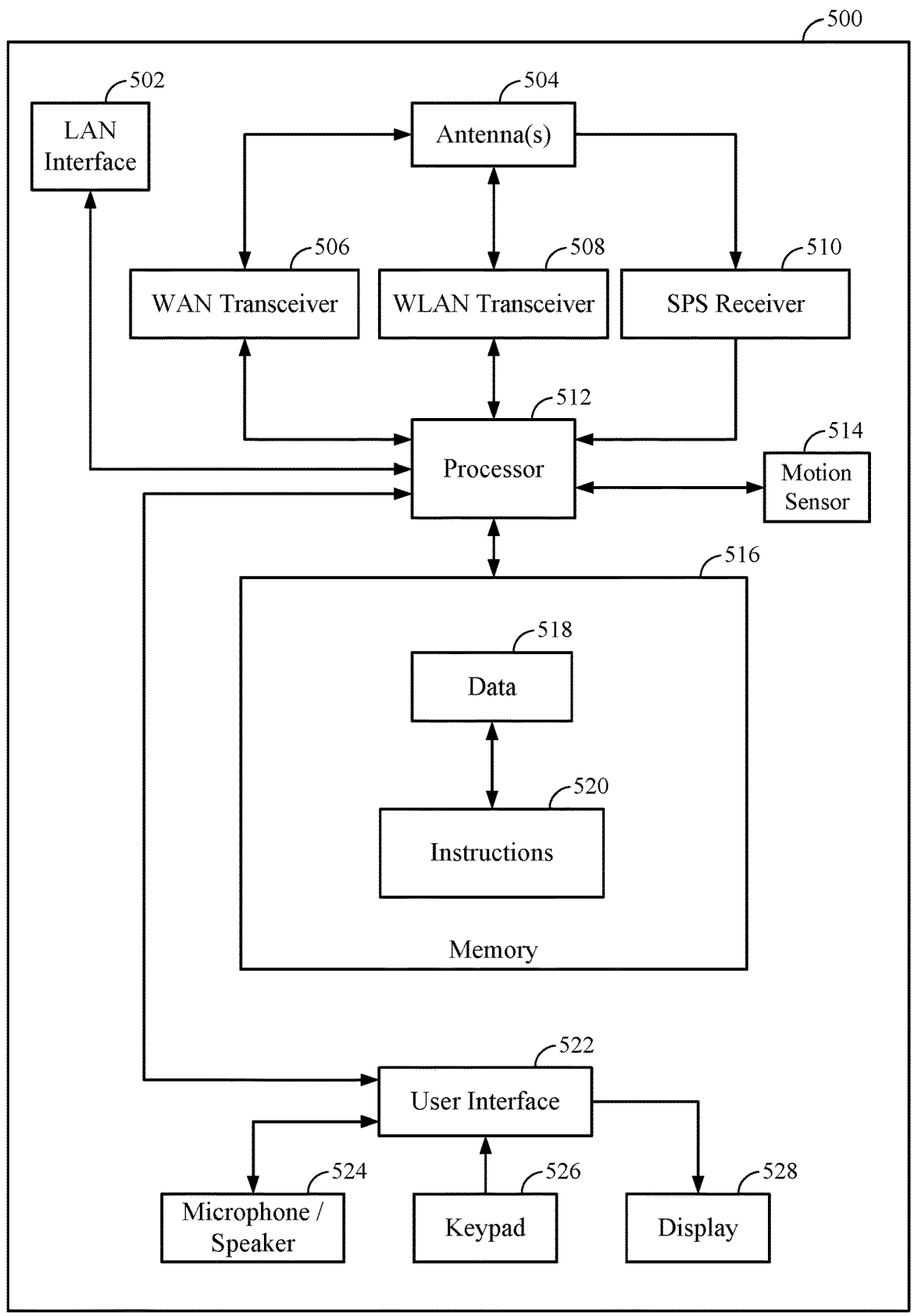
FIG. 5 is a block diagram of one example of the user equipment of FIG. 1.

FIG. 5 is a block diagram illustrating an example of the UE 500, which also can apply to the UE 501 of FIG. 1. The UE 500 as shown in FIG. 5 may be a mobile device, a handheld computer, a tablet, a wearable device, a smart watch, or any type of device capable of interacting with a user, for example. Additionally, the UE 500 may be a network side device that provides connectivity to various ultimate end user devices and/or to various public or private networks. In the example shown in FIG. 5, the UE 500 may comprise a LAN interface 502, one or more antennas 504, a wide area network (WAN) transceiver 506, a wireless local area network (WLAN) transceiver 508, and a satellite positioning system (SPS) receiver 510. The SPS receiver 510 may be compatible with the Global Positioning System (GPS), the Global Navigation Satellite System (GLONASS) and/or any other global or regional satellite based positioning system. In an alternate aspect, the UE 500 may include the WLAN transceiver 508, such as a Wi-Fi transceiver, with or without the LAN interface 502, the WAN transceiver 506, and/or the SPS receiver 510, for example. Further, the UE 500 may include additional transceivers such as Bluetooth®, ZigBee®, and other known technologies, with or without the LAN interface 502, the WAN transceiver 506, the WLAN transceiver 508 and/or the SPS receiver 510. Accordingly, the elements illustrated for the UE 500 are provided merely as an example configuration and are not intended to limit the configuration of UEs in accordance with the various aspects disclosed herein.

In the example shown in FIG. 5, a processor 512 is connected to the LAN interface 502, the WAN transceiver 506, the WLAN transceiver 508 and the SPS receiver 510. Optionally, a motion sensor 514 and other sensors may also be coupled to the processor 512.

A memory 516 is connected to the processor 512. In one aspect, the memory 516 may include data 518 which may be transmitted to and/or received from the UT 400, as shown in FIG. 1. Referring to FIG. 5, the memory 516 may also include stored instructions 520 to be executed by the processor 512 to perform the process steps for communicating with the UT 400, for example. Furthermore, the UE 500 may also include a user interface 522, which may include hardware and software for interfacing inputs or outputs of the processor 512 with the user through light, sound or tactile inputs or outputs, for example. In the example shown in FIG. 5, the UE 500 includes a microphone/speaker 524, a keypad 526, and a display 528 connected to the user interface 522. Alternatively, the user's tactile input or output may be integrated with the display 528 by using a touch-screen display, for example. Once again, the elements illustrated in FIG. 5 are not intended to limit the configuration of the UEs disclosed herein and it will be appreciated that the elements included in the UE 500 will vary based on the end use of the device and the design choices of the system engineers.

Additionally, the UE 500 may be a user device such as a mobile device or external network side device in communication with but separate from the UT 400 as illustrated in FIG. 1, for example. Alternatively, the UE 500 and the UT 400 may be integral parts of a single physical device.

Figure 6:
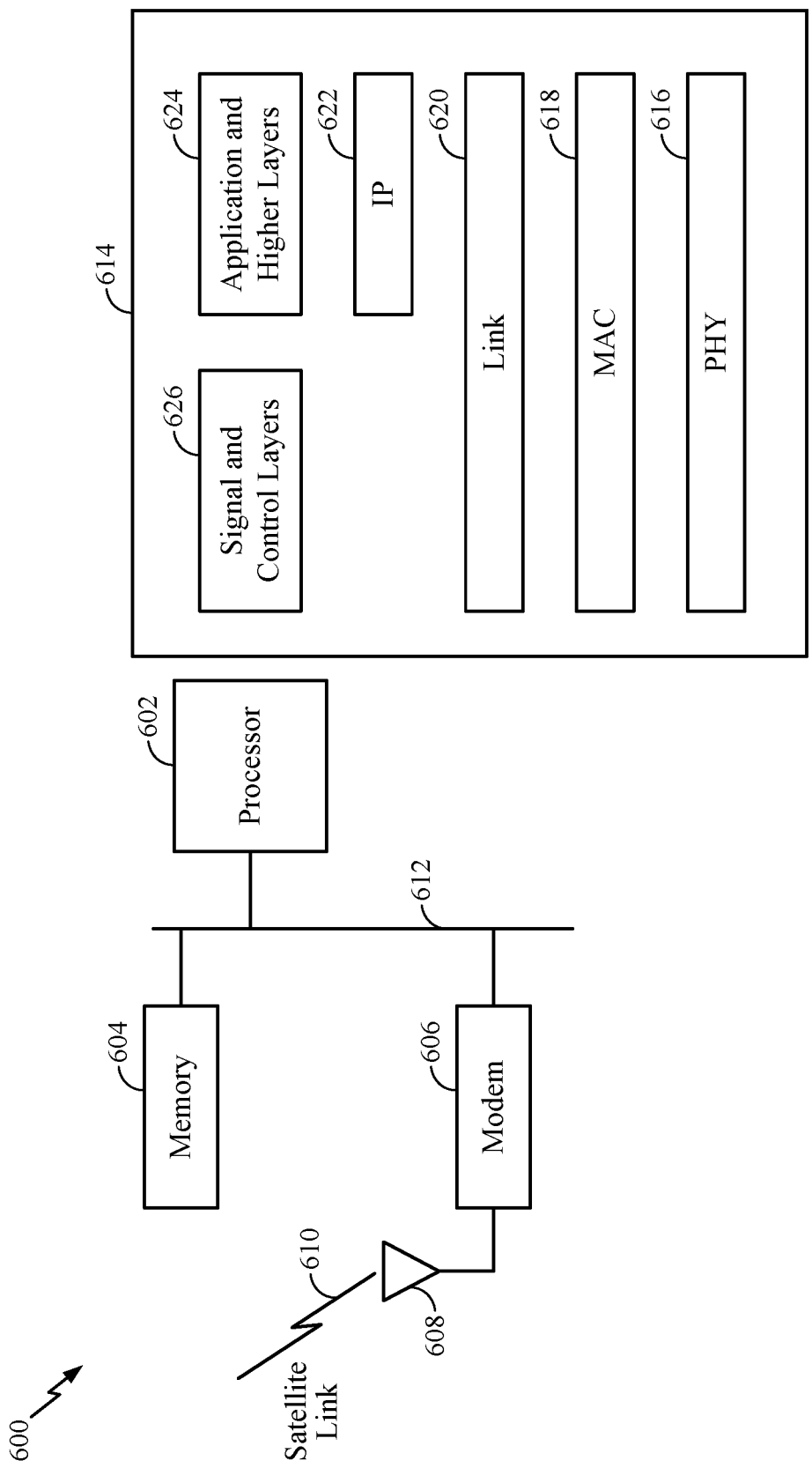
FIG. 6 is a block diagram of one example of a signal processing system with a protocol stack representing the gateway or the user terminal of FIG. 1.

FIG. 6 illustrates a signal processing system 600 that abstracts some components of a UT or a gateway. Illustrated in FIG. 6 are a processor 602 (the term "processor" is to include multiple processor cores on one or more chips), a memory 604, and a modem 606 coupled to the antenna 608. The satellite link 610 may represent any one of the satellite links in FIG. 1 originating from the gateway 200 or the UTs 400 or 401 and terminating at the satellite 300. The antenna 608 may be configured for transmitting right-hand polarized electromagnetic radiation or left-hand polarized electromagnetic radiation, and may comprise multiple elements for beam steering. For ease of illustration, a single bus, denoted as the bus 612, allows communication among the components in FIG. 6, but in practice a UT or a gateway may utilize one or more busses and one or more point-to-point interconnects, or other types of interconnection technology.

The signal processing system 600 may implement one or more protocol stacks, such as for example the protocol stack 614. For ease of illustration, the protocol stack 614 does not show all layers in a typical protocol stack. Illustrated in the protocol stack 614 are the physical layer (PHY) 616, the media access control layer (MAC) 618, and the link layer 620. The PHY 616 provides RF (Radio Frequency) modulation and demodulation for signals transmitted and received via the antenna 608, the PHY 616 and MAC 618 provide framing, encoding and decoding (e.g., block coding, convolutional coding, turbo coding), and the link layer 620 provides functionality so that data may be multiplexed and demultiplexed. The above functional descriptions of the PHY 616, MAC 618, and the link layer 620 are not meant to be exhaustive or exclusive, but are merely provided to indicate that their functionalities are similar to some of the protocol layers in the Open Systems Interconnection model (OSI) model.

Above the link layer 620 are additional layers for accessing the Internet or using voice over Internet Protocol (VoIP), such as for example the Internet Protocol (IP) layer 622 and additional layers, referred to in FIG. 6 as the application and higher layers 624. The application and higher layers 624 and the IP layer 622, together with the layers below them, define a communication plane for providing VoIP, web surfing, and other communication functionalities.

Other layers above the link layer 620 may define other planes. For example, the layer in FIG. 6 referred to as the signal and control layers 626 provides additional functionality in the way of a signal plane and a control plane so that a voice call may be set up and various parameters may be set (controlled).

Some of the functionality of the layers in the protocol stack 614 may be performed by software running on the processor 602, and some of the functionality may be performed by hardware under control of firmware. In some instances, some of the functionality of the layers in the protocol stack 614 may be performed by special purpose hardware, for example application specific integrated circuits (ASIC), or field programmable gate arrays (FPGA). For example, the modem 606 may perform some or all of the functionality of the PHY 616. The software for performing some of the functionality of the protocol stack 614, as well as further functionality to be described, may be stored in the memory 604. The memory 604 may represent a memory hierarchy, and may be referred to as a non-transitory computer-readable media.

The signal processing system 600 may implement multiple instances of the protocol stack 614, as well as other protocol stacks to communicate with other devices, such as for example the UE 500 or 501. A protocol stack provides functionality to realize multiple physical and logical channels for forward or return links.

Figure 7:
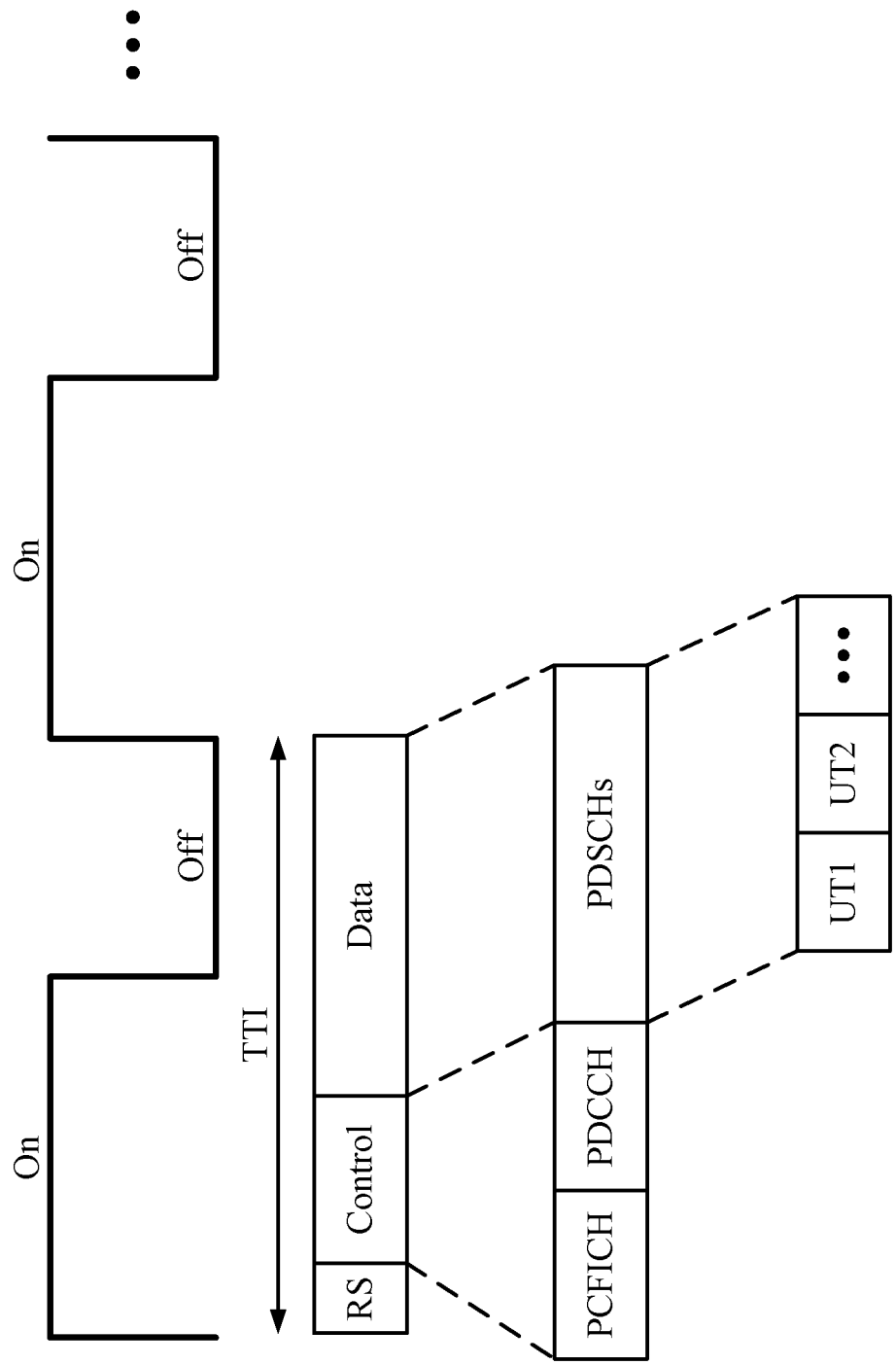
FIG. 7 is a timing diagram illustrating an example of a transmission time interval (TTI) in a TTI gating mode.

In one aspect, power consumption by power amplifiers on the satellite, for example, by the power amplifiers 316(1)-316(N) on the satellite 300 as illustrated in FIG. 3, can be reduced by gating a transmission time interval (TTI) with an on period and an off period. In one aspect, when the satellite is operating in a TTI gating mode, the satellite may turn off the power for forward link power amplifiers during the off period of each TTI to reduce the overall power consumption of the satellite. FIG. 7 is a timing diagram illustrating an aspect of a time slot called a transmission time interval (TTI). In some implementations, the duration of a TTI is 1 ms, for example.

As illustrated in FIG. 7, the TTI for forward link transmission includes three regions, namely, a reference signal (RS) region, a control region and a data region. In the TTI level gated transmission mode, also known as the TTI gating mode, a TTI is divided into an on period and an off period. In one aspect, the on period of the TTI includes the RS region, the control region, and a portion of the data region. The off period of the TTI covers the remaining portion of the data region not covered by the on period.

In one aspect, the control region of the TTI includes one or more physical control format indicator channels (PC-FICHs) and one or more physical downlink control channels (PDCCHs), for example. In alternative aspects, other types of physical layer control channels may be provided in the control region within the scope of the disclosure. In one aspect, the data region of the TTI includes a plurality of physical downlink shared channels (PDSCHs) for downlink or forward link data transmissions from the satellite to a plurality of UTs (UT1, UT2, . . . ). In alternative aspects, other types of forward link channels for transmitting data from the satellite to the UTs may be provided in the data region within the scope of the disclosure.

In one aspect, for a given satellite in a constellation of communication satellites, a gateway may enable or disable the TTI gating mode by sending a signal through a communication channel between the gateway and the satellite. For example, the signal to enable or to disable the TTI gating mode for the satellite may be sent by the gateway to the satellite through a telemetry, tracking and control (TT&C) channel. Alternatively, the signal to trigger the enabling or disabling of the TTI gating mode for the satellite may be transmitted by the gateway to the satellite through another channel. For example, the enable or disable trigger signal may be embedded in a transponded forward link signal.

In one aspect, the gateway determines the lengths of the on and off periods of a TTI in the TTI gating mode. In one aspect, if the TTI gating mode is enabled, the gateway sends a signal carrying the information specifying the length of the on or off period in a TTI to the satellite through a communication channel between the gateway and the satellite. For example, this signal, along with the enable/disable signal for the TTI gating mode, may be sent by the gateway to the satellite through the TT&C channel. Alternatively, the signal carrying the information specifying the length of the on or off period in a TTI may be transmitted by the gateway to the satellite through another channel.

The gateway may send the specified lengths of both the on period and the off period to the satellite. Alternatively, if the total length of the TTI is fixed or standardized, for example, a TTI having a duration of 1 ms, then the gateway may need to send only the specified length of either the on period or the off period to the satellite, which may compute length of the off period or the on period based on the specified length of the on period or the off period received from the gateway, respectively. In another alternative, the on and off intervals in a gated TTI can be explicitly defined by the enable and disable trigger signals which specify the on start or off start times for the on and off periods, respectively.

In one aspect, the satellite may synchronize or acquire the subframe boundary of forward link transmission, for example, the leading edge of the TTI, by using a GPS receiver or a forward link waveform searcher on the satellite. In response to the TTI gating mode enable signal and the signal carrying the information specifying the length of the on or off period in a TTI from the gateway, the satellite may turn on or off its power amplifier for forward link transmission according to the on or off period of the TTI. In one aspect, power consumption may be reduced in a satellite that is capable of discontinuous transmission (DTX) by turning on and off its power amplifier according to the on and off periods in the TTI gating mode.

In one aspect, the gating of a TTI, that is, the provision of on and off periods in a TTI, is transparent to a UT in the coverage of the satellite. In other words, the UT need not be aware that forward link transmission from the satellite is in a TTI gating mode. In a further aspect, the UT also need not be aware of the specific configuration of the TTI gating mode, for example, the lengths of the on and off time periods in a given TTI. In one aspect, the gateway schedules forward link transmission from the satellite to the UTs in compliance with the TTI gating configuration, including the lengths of the on and off time periods in a given TTI. In one aspect, the gateway does not schedule data transmission in the forward link during the off period of the TTI.

In one aspect, when the satellite is operating in the TTI gating mode, the UT operates its tracking loops based on the reference signal (RS) of the TTI and demodulates data based on resource allocation indicated by PDCCHs in the control region of the TTI as shown in FIG. 7, in the same manner as if the satellite is operating in a conventional non-TTI gating mode. As illustrated in FIG. 7, the RS and the control region are covered by the on period of the TTI in the TTI gating mode. In a conventional non-TTI gating mode, the forward link power amplifier on the satellite is always on when the RS and the resource allocation indicated by physical control channels in the control region are being transmitted to the UT.

In this implementation, the UT operates its tracking loops according to the RS and demodulates data according to the resource allocation in the control region, regardless of whether forward link transmission from the satellite is in the TTI gating mode or in the conventional non-TTI gating mode. No processing overhead is required for the UT to discern whether the satellite is transmitting in the TTI gating mode or not, or to process data in different manners based on whether forward link transmission from the satellite is in the TTI gating mode or not, thereby avoiding the need for increased complexity or cost on the part of the UT.

In one aspect, the TTI gating mode is the discontinuous transmission (DTX) mode for the satellite, which acts as a bent-pipe relay or transponder to relay forward link signals from the gateway to the UT. In one aspect, forward link DTX transmission from the gateway may but is not required to be synchronized with forward link DTX transmission from the satellite operating in the TTI gating mode.

In some implementations, forward link DTX transmission from the satellite in the TTI gating mode may be asynchronous with respect to forward link DTX transmission from the gateway to the satellite. In one example, after the gateway signals the satellite to enter the TTI gating mode, the gateway may continue to keep its own power amplifier on during the off period of the gated TTI for the satellite. In another example, the gateway power amplifier is kept on for a longer period of time than the on period of the gated TTI for the satellite, but is turned off some time after the satellite has entered the off period of the gated TTI. In this example, the DTX mode for the gateway is asynchronous with respect to the TTI gating mode for the satellite.

In another example, the period of time in which the UTs that are actually being scheduled to receive forward link transmission falls within the on period of the gateway in the DTX mode. In this example, the satellite needs to have an on period that at least spans the period in which the scheduler is assigning to the UTs, which is called a valid scheduler interval. In one aspect, the on period for the gateway power amplifier in the DTX mode needs to span at least the valid scheduler interval. Likewise, the on period for the satellite power amplifier in the TTI gating mode also needs to span at least the valid scheduler interval. In one aspect, the on period for the gateway power amplifier in the DTX mode and the on period for the satellite power amplifier in the TTI gating mode need not be exactly aligned and need not have exactly the same length, as long as both the on period for the gateway power amplifier and the on period for the satellite power amplifier cover at least the valid scheduler interval.

In other implementations, the gateway power amplifier may operate in a DTX mode synchronously with the satellite power amplifier in a gated TTI mode. For example, in forward link transmission, the on and off periods of a given TTI may be the same for the gateway power amplifier operating in the DTX mode and for the satellite power amplifier operating in the gated TTI mode. The leading of edge of the on period of the TTI at the satellite may be time-delayed relative to the leading edge of the on period of the TTI at the gateway, and likewise, the start of the off period of the TTI at the satellite may be time-delayed relative to the start of the off period of the TTI at the gateway, taking into account the time offset including the propagation delay of RF signals between the gateway and the satellite.

In one aspect, different satellites in a satellite communication system may but are not required to have the same TTI gating configuration, that is, the same amounts of on and off time periods in the same TTI gating mode. In one aspect, some of the satellites may be in TTI gating modes while others are not. In one aspect, different satellites in TTI gating modes may have different amounts of on time periods and different amounts of corresponding off time periods. For example, one of the satellites in a TTI gating mode may have an on period which is 10% of the TTI, whereas another satellite in a different TTI gating mode may have an on period which is 20% of the TTI.

In one aspect, in a given satellite with multiple beams, different beams of that satellite may also have different TTI gating modes. Some of the beams may be operating in a non-TTI gating mode, that is, a continuous transmission mode, while other beams from the same satellite may be operating in TTI gating modes. Among the beams of a given satellite operating in TTI gating modes, the individual beams may have different amounts of on time periods and different amounts of corresponding off time periods. Again, in this example, the provision of the on and off periods in TTI gating modes is transparent to UTs communicating with the satellite. In other words, the UTs need not know whether forward transmission in a given beam is in a TTI gating mode, and need not know the specific configuration of the TTI gating mode, including, for example, the lengths of the on and off time periods in a given TTI.

Figure 8:
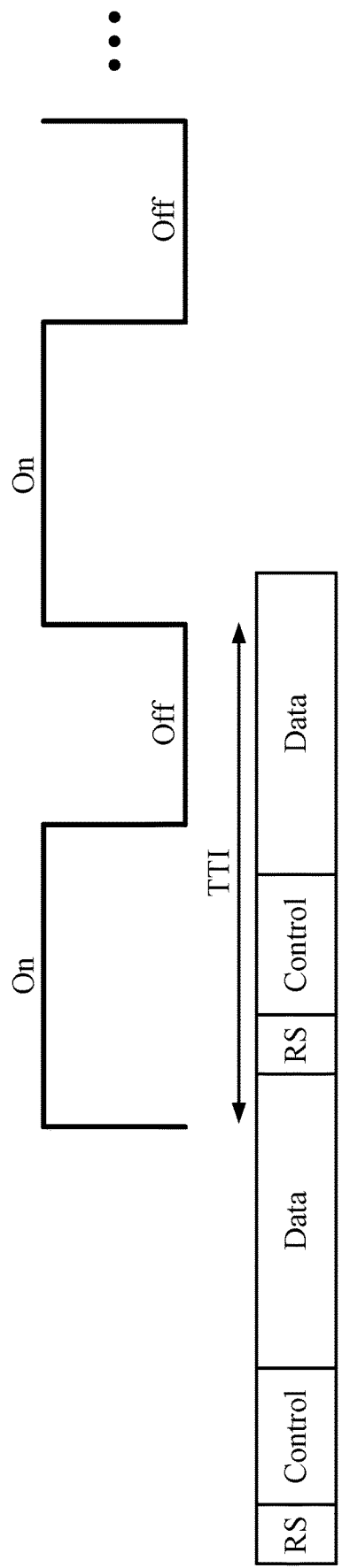
FIG. 8 is a timing diagram illustrating another example of a TTI in a TTI gating mode.

FIG. 8 is a timing diagram illustrating another example of a transmission time interval (TTI) in a TTI gating mode. The TTI as illustrated in FIG. 8 is similar to the TTI as illustrated in FIG. 7 and described above, except that the on period of the TTI covers a portion of another data region preceding the RS, as well as a portion of the data region succeeding the control signals in the control region. In this implementation, the leading edge of the on period of the TTI need not be aligned with the start of the RS. In various implementations, the on period of the TTI covers the RS and the control region, as well as one or more portions of one or more data regions preceding and/or succeeding the RS and the control region.

Figure 9:
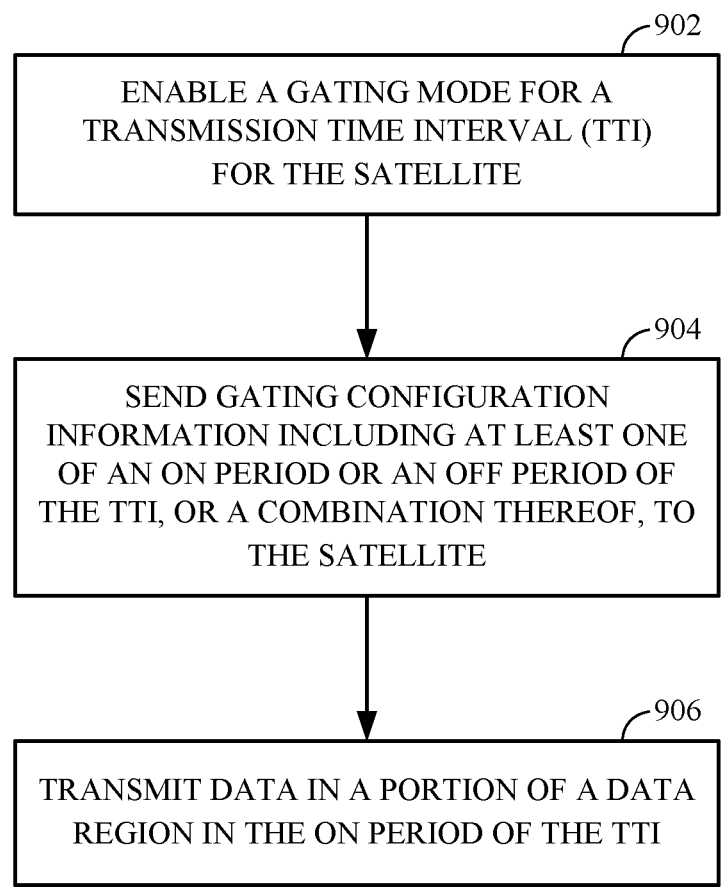
FIG. 9 is a flowchart illustrating an aspect of TTI gating control of a satellite by a gateway in a satellite communication system.

FIG. 9 is a flowchart illustrating an aspect of TTI gating control of a satellite by a gateway in a satellite communication system. It will be appreciated that processes indicated in FIG. 9, although illustrated in an ordered flow diagram, are not necessarily performed in the order indicated in FIG. 9. Moreover, it will be appreciated that some of the processes indicated in FIG. 9 may be optional and need not be performed by a particular gateway. For example, some of the processes may be performed by other parts of the satellite communication system, for example, by infrastructure 106 which is connected to gateways 200 and 201, as illustrated in FIG. 1.

Referring to FIG. 9, a gating mode for a transmission time interval (TTI) for the satellite is enabled in block 902. In one aspect, the gateway may enable the TTI gating mode for the satellite by sending a TTI gating mode enable signal through a forward link communication channel between the gateway and the satellite. In one aspect, the gateway may send the TTI gating mode enable signal to the satellite through the TT&C channel as described above, for example. Alternatively, the TTI gating mode enable signal may be sent to the satellite through another channel.

Along with the TTI gating mode enable signal, gating configuration information including at least one of an on period or an off period of the TTI, or a combination thereof, is sent to the satellite, as indicated in block 904. In one aspect, the gateway transmits a signal carrying the information specifying the TTI gating configuration to the satellite through a forward link communication channel, for example, through the TT&C channel as described above. Alternatively, the information specifying the TTI gating configuration may be transmitted to the satellite through another channel.

In one aspect, information specifying the lengths of both on and off periods are sent to the satellite, which in response gates the forward link transmission within a TTI according to the specified lengths of the on and off periods. In another aspect, if the total length of time for a TTI is fixed or standardized, then only the specified length of either the on period or the off period need be transmitted from the gateway to the satellite, and the satellite may derive the length of the off period based on the specified length of the on period received from the gateway, or vice versa.

Referring to FIG. 9, data in a portion of a data region in the on period of the TTI is transmitted from the gateway to the satellite in block 906. In one aspect, a reference signal (RS) and one or more control signals are also transmitted from the gateway to the satellite during the on period of the TTI. In one implementation, control signals in the control region of the TTI may be sent through one or more physical control channels, including, for example, PCFICH and PDCCH, as described above. Other types of control channels allocated for physical layer control signals may be provided in the control region within the scope of the disclosure. In one aspect, the portion of the data region within the on period of the gated TTI may include one or more PDSCHs for forward link data transmissions from the satellite to one or more UTs.

In one aspect, the gateway may optionally turn off its own power amplifier in a DTX mode. As described above, the gateway may turn on and off its power amplifier periodically in a DTX mode either synchronously or asynchronously with respect to TTI gating by the satellite. In one aspect, the DTX mode for the gateway is synchronous with the TTI gating mode for the satellite. In another aspect, the gateway power amplifier may be turned off some time after the forward link power amplifier on the satellite is turned off, and thus the DTX mode for the gateway is asynchronous with respect to the TTI gating mode for the satellite. In yet another aspect, the gateway power amplifier may be on continuously even if the forward link power amplifier on the satellite is operating in the TTI gating mode with on and off periods.

Figure 10:
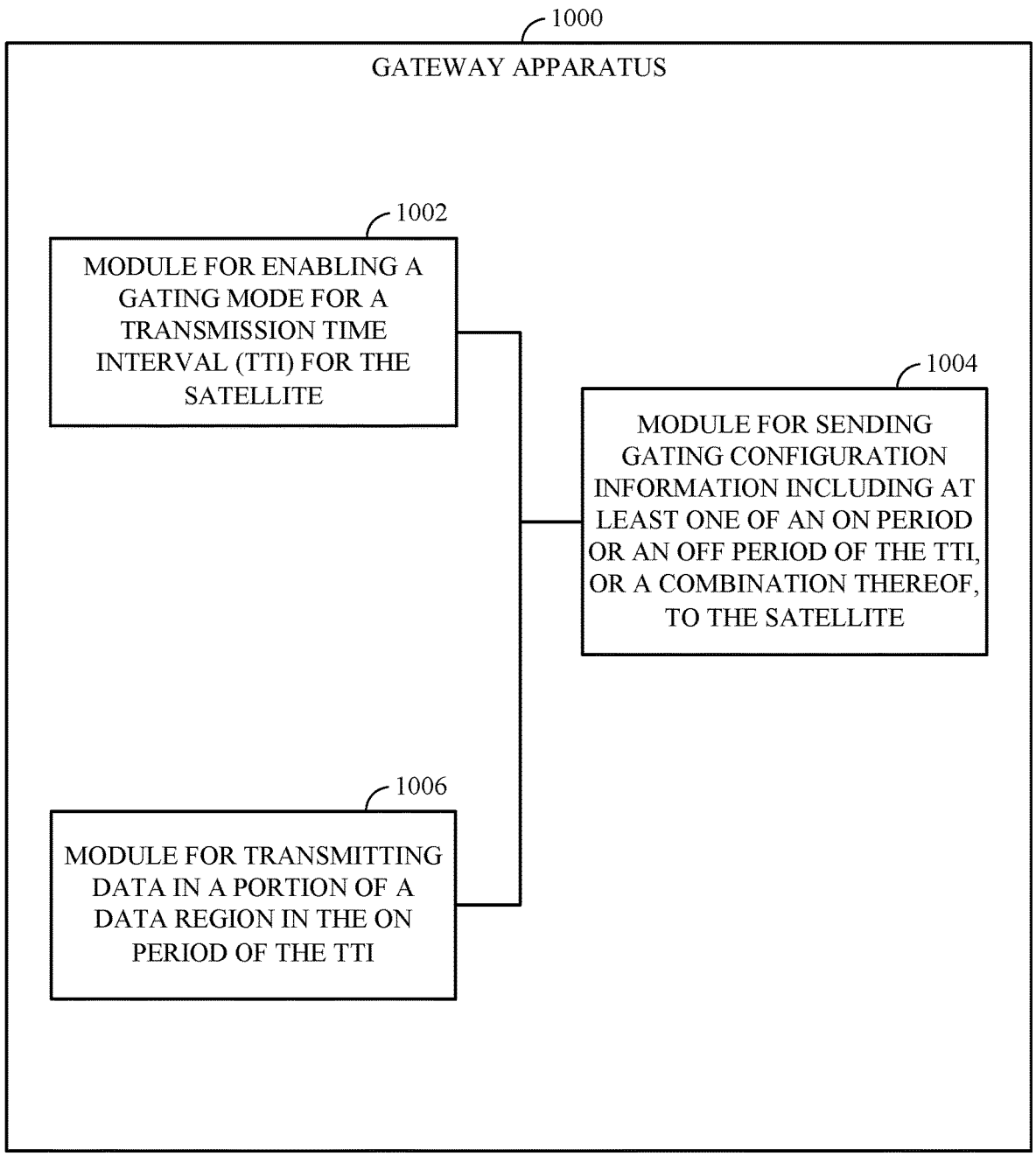
FIG. 10 illustrates an example of a gateway apparatus represented as a series of interrelated functional modules.

FIG. 10 illustrates an example of a gateway apparatus 1000 represented as a series of interrelated functional modules. A module 1002 for enabling a gating mode for a transmission time interval (TTI) for the satellite may correspond, at least in some aspects to, for example, a gateway controller or a component thereof as discussed herein (e.g., the gateway controller 250 or the like). A module 1004 for sending gating configuration information including at least one of an on period or an off period of the TTI, or a combination thereof, to the satellite may correspond, at least in some aspects to, for example, a gateway transmitter or a component thereof as discussed herein (e.g., the digital sub-system 220, the RF sub-system 210, or the like). A module 1006 for transmitting data in a portion of a data region in the on period of the TTI may correspond, at least in some aspects to, for example, a gateway transmitter or a component thereof as discussed herein (e.g., the digital sub-system 220, the RF sub-system 210, or the like).

The functionality of the modules of FIG. 10 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 10, as well as other components and functions described herein, may be implemented using any suitable means. Such means also may be implemented, at least in part, using corresponding structure as taught herein. For example, the components described above in conjunction with the "module for" components of FIG. 10 also may correspond to similarly designated "means for" functionality. Thus, in some aspects one or more of such means may be implemented using one or more of processor components, integrated circuits, or other suitable structure as taught herein.

Figure 11:
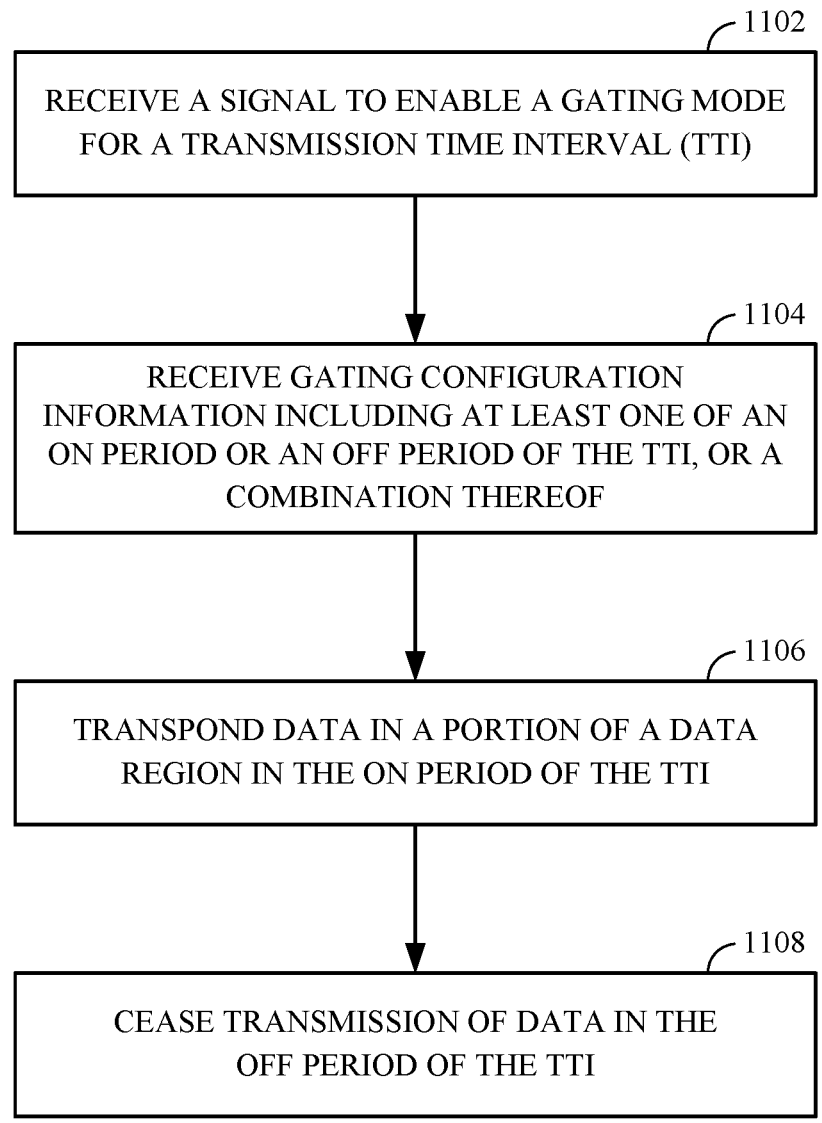
FIG. 11 is a flowchart illustrating an aspect of operations in the TTI gating mode by a satellite in a satellite communication system.

FIG. 11 is a flowchart illustrating an aspect of operations in the TTI gating mode by a satellite in a satellite communication system. Again, it will be appreciated that processes indicated in FIG. 11, although illustrated in an ordered flow diagram, are not necessarily performed in the order indicated in FIG. 11. Moreover, it will be appreciated that some of the processes indicated in FIG. 11 may be optional.

Referring to FIG. 11, a signal to enable a gating mode for a transmission time interval (TTI) is received by the satellite in block 1102. In one aspect, the signal enabling the TTI gating mode may be received through a forward link communication channel between the gateway and the satellite. In one aspect, the TTI gating mode enable signal is received by the satellite through the TT&C channel as described above, for example. Alternatively, the TTI gating mode enable signal may be received by the satellite through another channel.

Along with the TTI gating mode enable signal, the satellite receives from the gateway gating configuration information including at least one of an on period or an off period of the TTI, or a combination thereof, as indicated in block 1104. In one aspect, the satellite receives the information specifying the TTI gating configuration from the gateway through a forward link communication channel, for example, through the TT&C channel as described above. Alternatively, the information specifying the TTI gating configuration may be received by the satellite through another channel.

In one aspect, the satellite receives information specifying the lengths of both on and off periods of a gated TTI. In another aspect, if the total length of time for a TTI is fixed or standardized, then only the specified length of either the on period or the off period need be received by the satellite, which may derive the length of the off period based on the specified length of the on period, or vice versa.

On the other hand, if the satellite fails to receive a signal enabling the TTI gating mode as indicated in block 1102, then the satellite may operate in a conventional non-TTI gating mode, in which the forward link power amplifier on the satellite remains on continuously. When the satellite is operating in a non-TTI gating mode, it need not receive or use information specifying the on and off time periods for TTI gating.

Referring to FIG. 11, if the TTI gating mode is enabled for the satellite as indicated in block 1102 and the specified on or off period for the gated TTI is received by the satellite as indicated in block 1104, then data in a portion of a data region in the on period of the TTI is transponded by the satellite, as indicated in block 1106. In one implementation, a reference signal (RS) and one or more control signals in a control region are also transponded during the on period of the TTI. In one aspect, the control region may include one or more physical control channels, for example, PCFICH and PDCCH, as described above. Other types of control channels also may be provided in the control region within the scope of the disclosure. In one aspect, the portion of the data region within the on period of the gated TTI may include one or more PDSCHs for forward link data transmissions from the satellite to one or more UTs as described above.

The satellite ceases transmission of data in the off period of the TTI in block 1108. In one implementation, the power amplifier of the satellite is off and there is no transmission of data to the UT during the off period of the TTI to save power. In one implementation, the satellite may turn off its forward link power amplifier and stop forward link transmission to the UT at the start of the off period of the TTI.

The amount of power saved by periodically turning off the forward link power amplifier of the satellite in the TTI gating mode depends on the length of the on period relative to the length of the TTI. For example, if the on period is 0.1 ms in a TTI of 1 ms, that is, if the on period is 10% of the TTI, then power consumption by the forward link power amplifier on the satellite can be reduced by as much as 90%. If the on period occupies 50% of the TTI, for example, power consumption by the forward link power amplifier still can be reduced by as much as 50%. In a typical relay or transponder satellite, power amplifiers may be significant contributors to overall power consumption by the satellite.

By operating power amplifiers in TTI gating modes, significant reductions in power consumption may be realized for the satellite.

In one aspect, a fault detection mode is provided for detecting whether the actual on and off time periods of the satellite operating in the DTX or TTI gating mode are not consistent with the on and off periods assumed or configured at the gateway. Such discrepancies may occur for a variety of reasons, including, for example, an error in the transmission of the DTX or TTI gating configuration from the gateway to the satellite. For example, in a system that deploys hybrid automatic repeat request (HARQ) with acknowledgement/non-acknowledgement (ACK/NACK) of transmission, if a scheduler detects that all transmitted packets beyond a certain point of time in the TTI are always in error, the detected errors may be an indication of a mismatch between the assumed satellite DTX or TTI gating configuration by the gateway and the actual DTX or TTI gating configuration under which the satellite operates. For example, if the satellite power amplifier turns off too early, all transmitted packets that are being transponded after the early turn off by the satellite power amplifier will likely be in error. This correlated error sequence would be a good indication of a discrepancy between the assumed and actual satellite DTX or TTI gating configuration.

Figure 12:
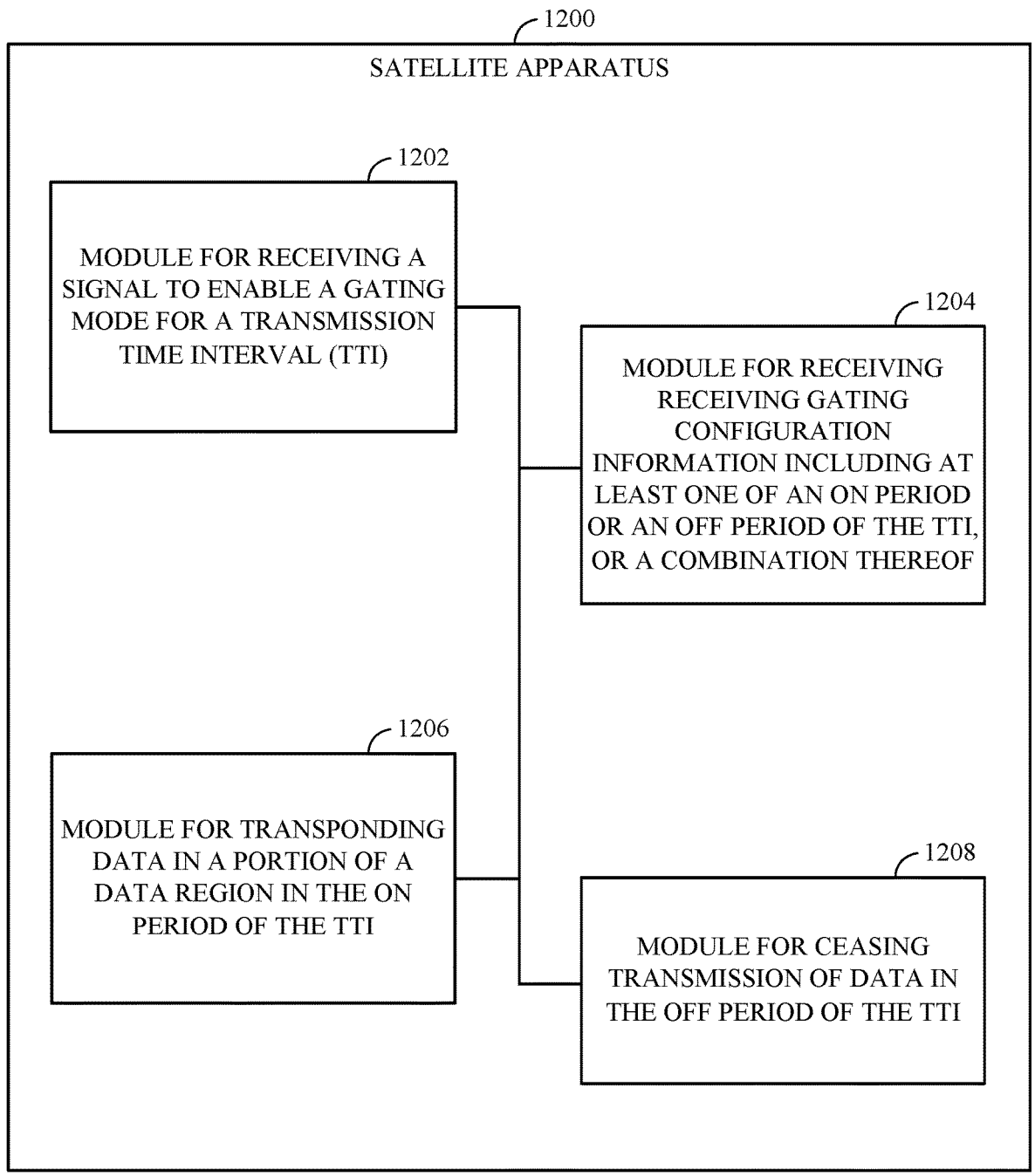
FIG. 12 illustrates an example of a satellite apparatus represented as a series of interrelated functional modules.

FIG. 12 illustrates an example of a satellite apparatus 1200 represented as a series of interrelated functional modules. A module 1202 for receiving a signal to enable a gating mode for a transmission time interval (TTI) may correspond, at least in some aspects to, for example, a satellite receiver or a component thereof as discussed herein (e.g., one or more components of the forward transponder 310 or the like). A module 1204 for receiving gating configuration information including at least one of an on period or an off period of the TTI, or a combination thereof, may correspond, at least in some aspects to, for example, a satellite receiver or a component thereof as discussed herein (e.g., one or more components of the forward transponder 310 or the like). A module 1206 for transponding data in a portion of a data region in the on period of the TTI may correspond, at least in some aspects to, for example, a satellite transmitter or a component thereof as discussed herein (e.g., one or more components of the forward transponder 310 or the like). A module 1208 for ceasing transmission of data in the off period of the TTI may correspond, at least in some aspects to, for example, a satellite transmitter or a component thereof as discussed herein (e.g., one or more components of the forward transponder 310 or the like).

The functionality of the modules of FIG. 12 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 12, as well as other components and functions described herein, may be implemented using any suitable means. Such means also may be implemented, at least in part, using corresponding structure as taught herein. For example, the components described above in conjunction with the "module for" components of FIG. 12 also may correspond to similarly designated "means for" functionality. Thus, in some aspects one or more of such means may be implemented using one or more of processor components, integrated circuits, or other suitable structure as taught herein.

Figure 13:
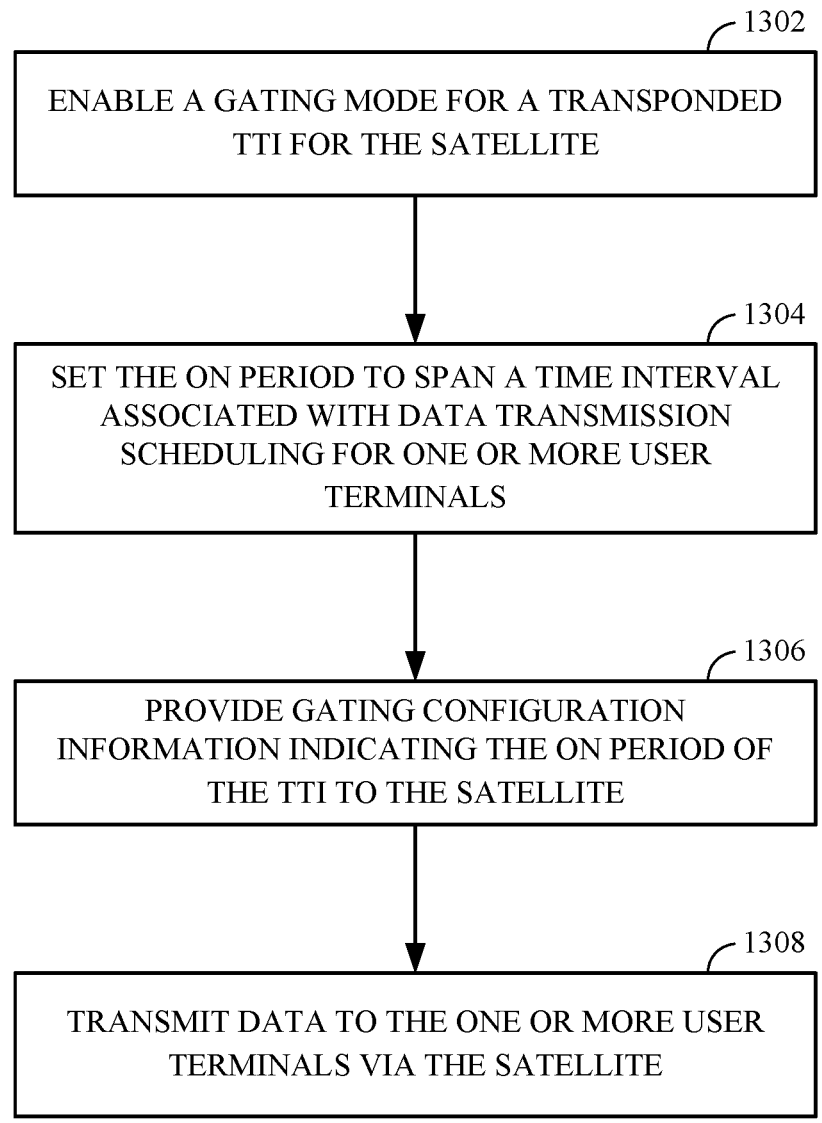
FIG. 13 is a flowchart illustrating other aspects of operations in the TTI gating mode.

FIG. 13 is a flowchart illustrating further aspects of operations in the TTI gating mode. Again, it will be appreciated that processes indicated in FIG. 13, although illustrated in an ordered flow diagram, are not necessarily performed in the order indicated in FIG. 13. Moreover, it will be appreciated that some of the processes indicated in FIG. 13 may be optional. Further, it will be appreciated that in different system configurations, different aspects of the processes indicated in FIG. 13 may be performed by a gateway such as the gateway 200 or a component thereof (e.g., the satellite TX power controller 202) or a satellite such as the satellite 300 or a component thereof (e.g., the controller 340).

Referring to FIG. 13, the gateway or the satellite may enable a gating mode for a transponded TTI for the satellite in block 1302. The gating mode defines an on period and an off period of the TTI. The gateway or the satellite may set the on period (e.g., start time and length) to span a time interval associated with data transmission scheduling for one or more user terminals (e.g., a valid scheduler interval in which transmission resources are assigned to the one or more user terminals) in block 1304. The gateway or the satellite may then provide, either directly or indirectly, gating configuration information indicating the on period of the TTI to the satellite in block 1306. During at least a portion of the on period of the TTI, gateway or the satellite may transmit data to the one or more user terminals via the satellite in block 1308.

As discussed in more detail above, in addition to data, other signals such as a reference signal, a control signal, or a combination thereof may be transmitted during at least one other portion of the on period of the TTI. The reference signal, the control signal, and the data may be transmitted during the on period in a manner that is decodable at the one or more user terminals independent of any signaling during the off period. Thus, the data transmission to a given user terminal can be processed by the user terminal based on transmissions contained solely within the on period.

In some designs, the gating configuration information may be provided to the satellite by the gateway sending the gating configuration information directly. In other designs, the gating configuration information may be determined by the satellite indirectly. For example, the satellite may determine the gating configuration information based on a transmit waveform associated with transmission from the gateway. If the transmission envelope includes periodic instances of inactivity, the satellite may infer that the inactivity corresponds to the off period of the TTI. As another example, the gating configuration information may be determined based on a position of the satellite. It may be predetermined that in certain positions, the satellite may gate the TTI and the gateway will be aware of these spatial schedules. Thus, the gating configuration information may be provided in advance, including several hours, days, etc. in advance.

As also discussed in more detail above, the satellite and the gateway may both transmit not only discontinuously but also asynchronously with respect to each other. For example, the satellite may receive the data from a gateway during at least a portion of the off period of the TTI, and transpond the data to the one or more user terminals during at least a portion of the on period of the TTI.

Figure 14:
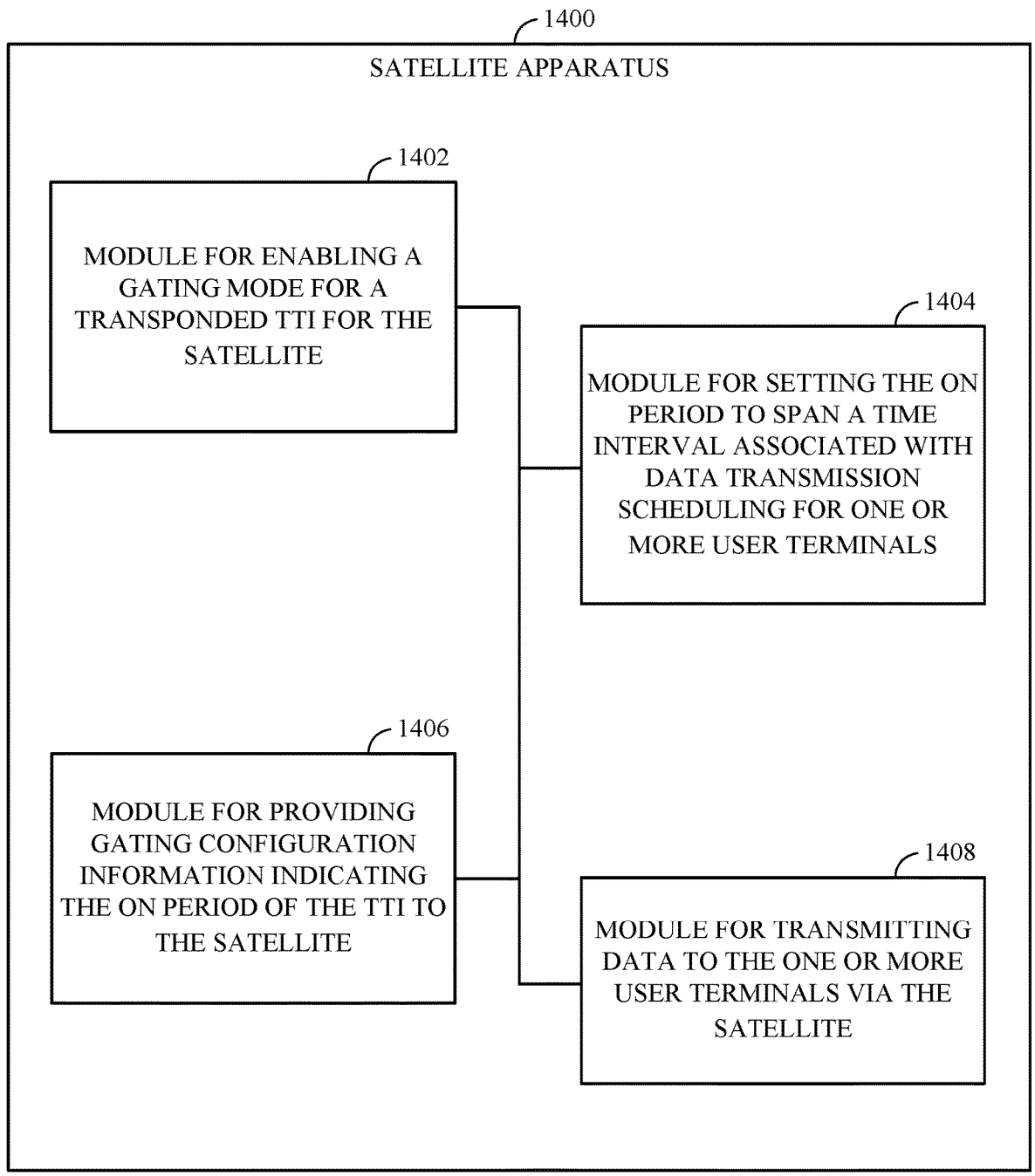
FIG. 14 illustrates another example apparatus represented as a series of interrelated functional modules.

FIG. 14 illustrates an example of another apparatus 1400 represented as a series of interrelated functional modules. In this example, the apparatus 1400 may correspond to a gateway such as the gateway 200 or a component thereof (e.g., the satellite TX power controller 202) or a satellite such as the satellite 300 or a component thereof (e.g., the controller 340). A module 1402 for enabling may be configured to enable a gating mode for a transponded TTI for the satellite. A module 1404 for setting may be configured to set the on period (e.g., start time and length) to span a time interval associated with data transmission scheduling for one or more user terminals (e.g., a valid scheduler interval). A module 1406 for providing may be configured to provide, either directly or indirectly, gating configuration information indicating the on period of the TTI to the satellite. A module 1408 for transmitting may be configured to transmit, during at least a portion of the on period of the TTI, data to the one or more user terminals via the satellite.

The functionality of the modules of FIG. 14 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 14, as well as other components and functions described herein, may be implemented using any suitable means. Such means also may be implemented, at least in part, using corresponding structure as taught herein. For example, the components described above in conjunction with the "module for" components of FIG. 14 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, aspects of the claimed subject matter may include a non-transitory computer-readable media embodying a method for spectral efficient data transmission in satellite systems. Accordingly, the claimed subject matter is not limited to illustrated examples.

While the foregoing disclosure shows illustrative aspects of the claimed subject matter, it should be noted that various changes and modifications could be made herein without departing from the scope of the invention as defined by the appended claims. The functions, steps and/or actions of the method claims in accordance with the description herein need not be performed in any particular order. Furthermore, although aspects of the claimed subject matter may be described or claimed in the singular, the plural is contemplated unless limitation to the singular is explicitly stated.

What is claimed is:

1. A method of operating a gateway configured to control power of transmission of a satellite, the method comprising:
enabling a gating mode for a transmission time interval (TTI) for the satellite;
sending gating configuration information that indicates a length of at least one of an on period or an off period of the TTI, or a combination thereof, to the satellite;
transmitting data to the satellite in a portion of a data region in the on period of the TTI,
wherein the transmitting is based on an offset associated with a propagation delay of radio frequency (RF) signals to the satellite; and
powering off a gateway power amplifier in a discontinuous transmission (DTX) mode,
wherein the DTX mode for the gateway is synchronous or asynchronous with respect to the gating mode for the TTI of the satellite.

2. The method of claim 1, further comprising transmitting a reference signal (RS) and at least one control signal during the on period of the TTI.

3. The method of claim 2, wherein the at least one control signal comprises a physical control format indicator channel (PCFICH).

4. The method of claim 2, wherein the at least one control signal comprises a physical downlink control channel (PDCCH).

5. The method of claim 1, wherein the data region comprises a plurality of physical downlink shared channels (PDSCHs).

6. The method of claim 1, wherein the DTX mode for the gateway is synchronous with respect to the gating mode for the TTI of the satellite.

7. The method of claim 1, wherein the DTX mode for the gateway is asynchronous with respect to the gating mode for the TTI of the satellite.

8. The method of claim 1, wherein the gating mode for the TTI is not communicated to a user terminal.

9. An apparatus arranged as part of a gateway and configured to control power of transmission of a satellite, the apparatus comprising:
   at least one processor; and
   at least one memory coupled to the at least one processor, the at least one processor and the at least one memory being configured to:
      enable a gating mode for a transmission time interval (TTI) for the satellite;
      send gating configuration information that indicates a length of at least one of an on period or an off period of the TTI, or a combination thereof, to the satellite;
      transmit data to the satellite in a portion of a data region in the on period of the TTI,
      wherein the transmission of the data in the on period of the TTI is based on an offset associated with a propagation delay of radio frequency (RF) signals to the satellite; and
      power off a gateway power amplifier in a discontinuous transmission (DTX) mode,
      wherein the DTX mode for the gateway is synchronous or asynchronous with respect to the gating mode for the TTI of the satellite.

10. The apparatus of claim 9, wherein the at least one processor and the at least one memory are further configured to transmit a reference signal (RS) and at least one control signal during the on period of the TTI.

11. The apparatus of claim 10, wherein the at least one control signal comprises a physical control format indicator channel (PCFICH).

12. The apparatus of claim 10, wherein the at least one control signal comprises a physical downlink control channel (PDCCH).

13. The apparatus of claim 9, wherein the data region comprises a plurality of physical downlink shared channels (PDSCHs).

14. The apparatus of claim 9, wherein the DTX mode for the gateway is synchronous with respect to the gating mode for the TTI of the satellite.

15. The apparatus of claim 9, wherein the DTX mode for the gateway is asynchronous with respect to the gating mode for the TTI of the satellite.

16. The apparatus of claim 9, wherein the gating mode for the TTI is not communicated to a user terminal.

17. An apparatus arranged as part of a gateway and for controlling power of transmission of a satellite, the apparatus comprising:
   means for enabling a gating mode for a transmission time interval (TTI) for the satellite;
   means for sending gating configuration information that indicates a length of at least one of an on period or an off period of the TTI, or a combination thereof, to the satellite;
   means for transmitting data to the satellite in a portion of a data region in the on period of the TTI,
   wherein the means for transmitting is configured to transmit the data in the on period of the TTI based on an offset associated with a propagation delay of radio frequency (RF) signals to the satellite; and
   means for powering off a gateway power amplifier in a discontinuous transmission (DTX) mode,
   wherein the DTX mode for the gateway is synchronous or asynchronous with respect to the gating mode for the TTI of the satellite.

18. The apparatus of claim 17, further comprising means for transmitting a reference signal (RS) and at least one control signal during the on period of the TTI.

19. The apparatus of claim 18, wherein the at least one control signal comprises a physical control format indicator channel (PCFICH).

20. The apparatus of claim 18, wherein the at least one control signal comprises a physical downlink control channel (PDCCH).

21. The apparatus of claim 17, wherein the data region comprises a plurality of physical downlink shared channels (PDSCHs).

22. The apparatus of claim 17, wherein the DTX mode for the gateway is synchronous with respect to the gating mode for the TTI of the satellite.

23. The apparatus of claim 17, wherein the DTX mode for the gateway is asynchronous with respect to the gating mode for the TTI of the satellite.

24. The apparatus of claim 17, wherein the gating mode for the TTI is not communicated to a user terminal.

25. A non-transitory computer-readable medium comprising instructions for causing a computer or processor of a gateway to perform a method to control power of transmission of a satellite, the instructions comprising instructions to:
   enable a gating mode for a transmission time interval (TTI) for the satellite;
   send gating configuration information that indicates a length of at least one of an on period or an off period of the TTI, or a combination thereof, to the satellite;
   transmit data to the satellite in a portion of a data region in the on period of the TTI,
   wherein the transmission of the data in the on period of the TTI is based on an offset associated with a propagation delay of radio frequency (RF) signals to the satellite; and
   power off a gateway power amplifier in a discontinuous transmission (DTX) mode,
   wherein the DTX mode for the gateway is synchronous or asynchronous with respect to the gating mode for the TTI of the satellite.

26. The non-transitory computer-readable medium of claim 25, wherein the instructions further comprise at least one instruction to transmit a reference signal (RS) and at least one control signal during the on period of the TTI.

27. The non-transitory computer-readable medium of claim 26, wherein the at least one control signal comprises a physical control format indicator channel (PCFICH).

28. The non-transitory computer-readable medium of claim 26, wherein the at least one control signal comprises a physical downlink control channel (PDCCH).

29. The non-transitory computer-readable medium of claim 25, wherein the data region comprises a plurality of physical downlink shared channels (PDSCHs).

30. The non-transitory computer-readable medium of claim 25, wherein the DTX mode for the gateway is synchronous with respect to the gating mode for the TTI of the satellite.

31. The non-transitory computer-readable medium of claim 25, wherein the DTX mode for the gateway is asynchronous with respect to the gating mode for the TTI of the satellite.

32. The non-transitory computer-readable medium of claim 25, wherein the gating mode for the TTI is not communicated to a user terminal.

33. A method of controlling transmission of power by a satellite, the method comprising:
   receiving, at the satellite from a gateway, a signal that is embedded with data to trigger enablement of a gating mode for a transmission time interval (TTI);
   receiving, at the satellite from the gateway, gating configuration information that indicates a length of at least one of an on period or an off period of the TTI, or a combination thereof;
   transponding, by the satellite, data in a portion of a data region in the on period of the TTI; and
   ceasing, by the satellite, transmission of data in the off period of the TTI,
   wherein the transponding comprises relaying one or more signals between a gateway and a user terminal,
   wherein the transponded data comprises a reference signal (RS) and at least one control signal during the on period of the TTI, or the data region comprises a plurality of physical downlink shared channels (PDSCHs), or a combination thereof.

34. The method of claim 33, wherein the transponded data comprises the RS and the at least one control signal during the on period of the TTI.

35. The method of claim 34, wherein the at least one control signal comprises a physical control format indicator channel (PCFICH).

36. The method of claim 34, wherein the at least one control signal comprises a physical downlink control channel (PDCCH).

37. The method of claim 33, wherein the data region comprises the plurality of PDSCHs.

38. The method of claim 33, wherein the gating mode for the TTI is not communicated to the user terminal.

39. An apparatus configured to control power of transmission by a satellite, the apparatus comprising:
   at least one processor; and
   at least one memory coupled to the at least one processor, the at least one processor and the at least one memory being configured to:
      receive, at the satellite from a gateway, a signal that is embedded with data to trigger enablement of a gating mode for a transmission time interval (TTI);
      receive, at the satellite from the gateway, gating configuration information that indicates a length of at least one of an on period or an off period of the TTI, or a combination thereof;
      transpond, by the satellite, data in a portion of a data region in the on period of the TTI; and
      cease, by the satellite, transmission of data in the off period of the TTI,
   wherein the at least one processor and the at least one memory are further configured to relay one or more signals between a gateway and a user terminal,
   wherein the transponded data comprises a reference signal (RS) and at least one control signal during the on period of the TTI, or the data region comprises a plurality of physical downlink shared channels (PDSCHs), or a combination thereof.

40. The apparatus of claim 39, wherein the transponded data comprises the RS and the at least one control signal during the on period of the TTI.

41. The apparatus of claim 40, wherein the at least one control signal comprises a physical control format indicator channel (PCFICH).

42. The apparatus of claim 40, wherein the at least one control signal comprises a physical downlink control channel (PDCCH).

43. The apparatus of claim 39, wherein the data region comprises the plurality of PDSCHs.

44. The apparatus of claim 39, wherein the gating mode for the TTI is not communicated to the user terminal.

45. An apparatus for controlling power of transmission by a satellite, the apparatus comprising:
   means for receiving, at the satellite from a gateway, a signal that is embedded with data to trigger enablement of a gating mode for a transmission time interval (TTI);
   means for receiving, at the satellite from the gateway, gating configuration information that indicates a length of at least one of an on period or an off period of the TTI, or a combination thereof;
   means for transponding, by the satellite, data in a portion of a data region in the on period of the TTI; and
   means for ceasing, by the satellite, transmission of data in the off period of the TTI,
   wherein the means for transponding comprises means for relaying one or more signals between a gateway and a user terminal
   wherein the transponded data comprises a reference signal (RS) and at least one control signal during the on period of the TTI, or the data region comprises a plurality of physical downlink shared channels (PDSCHs), or a combination thereof.

46. The apparatus of claim 45, wherein the transponded data comprises the RS and the at least one control signal during the on period of the TTI.

47. The apparatus of claim 46, wherein the at least one control signal comprises a physical control format indicator channel (PCFICH).

48. The apparatus of claim 46, wherein the at least one control signal comprises a physical downlink control channel (PDCCH).

49. The apparatus of claim 45, wherein the data region comprises the plurality of PDSCHs.

50. The apparatus of claim 45, wherein the gating mode for the TTI is not communicated to the user terminal.

51. A non-transitory computer-readable medium comprising instructions for causing a computer or processor to perform a method to control power of transmission by a satellite, the instructions comprising instructions to:
   receive, at the satellite from a gateway, a signal that is embedded with data to trigger enablement of a gating mode for a transmission time interval (TTI);
   receive, at the satellite from the gateway, gating configuration information that indicates a length of at least one of an on period or an off period of the TTI, or a combination thereof;
   transpond, by the satellite, data in a portion of a data region in the on period of the TTI; and
   cease, by the satellite, transmission of data in the off period of the TTI,
   wherein the instructions to transpond comprise at least one instruction to relay one or more signals between a gateway and a user terminal,
   wherein the transponded data comprises a reference signal (RS) and at least one control signal during the on period of the TTI, or the data region comprises a plurality of physical downlink shared channels (PDSCHs), or a combination thereof.

52. The non-transitory computer-readable medium of claim 51, wherein the transponded data comprises the RS and the at least one control signal during the on period of the TTI.

53. The non-transitory computer-readable medium of claim 52, wherein the at least one control signal comprises a physical control format indicator channel (PCFICH).

54. The non-transitory computer-readable medium of claim 52, wherein the at least one control signal comprises a physical downlink control channel (PDCCH).

55. The non-transitory computer-readable medium of claim 51, wherein the data region comprises the plurality of PDSCHs.

56. The non-transitory computer-readable medium of claim 51, wherein the gating mode for the TTI is not communicated to the user terminal.

57. A method of controlling power of transmission of a satellite, the method comprising:
  enabling a gating mode for a transponded transmission time interval (TTI) for the satellite, wherein the gating mode defines an on period and an off period of the TTI;
  setting the on period to span a time interval associated with data transmission scheduling for one or more user terminals;
  providing gating configuration information indicating the on period of the TTI to the satellite; and
  transmitting data to the one or more user terminals via the satellite during at least a portion of the on period of the TTI, the transmitting including:
    receiving the data from a gateway during at least a portion of the off period of the TTI; and
    transponding the data to the one or more user terminals during at least the portion of the on period of the TTI.

58. The method of claim 57, wherein the setting comprises selecting a start time and a length of the on period.

59. The method of claim 57, further comprising transmitting a reference signal, a control signal, or a combination thereof during at least one other portion of the on period of the TTI.

60. The method of claim 59,
  wherein the reference signal and the control signal are both transmitted during the at least one other portion of the on period of the TTI, and
  wherein the reference signal, the control signal, and the data are transmitted during the on period in a manner that is decodable at the one or more user terminals independent of any signaling during the off period.

61. The method of claim 57, wherein the providing gating configuration information comprises sending the gating configuration information directly to the satellite from the gateway.

62. The method of claim 57, wherein the providing gating configuration information comprises determining the gating configuration information indirectly by the satellite.

63. The method of claim 62, wherein the determining comprises determining the gating configuration information based on a transmit waveform associated with transmission from the gateway.

64. The method of claim 62, wherein the determining comprises determining the gating configuration information based on a position of the satellite.

65. The method of claim 57, wherein the time interval that the on period is set to span corresponds to a valid scheduler interval in which transmission resources are assigned to the one or more user terminals.

* * * * *